(12) United States Patent
Cramer

(10) Patent No.: US 11,879,293 B2
(45) Date of Patent: Jan. 23, 2024

(54) SYSTEM AND METHOD FOR ANIMAL CONTAINMENT WITH LIGHT-POLARIZATION SYSTEM

(71) Applicant: Jeremy W. Cramer, Oklahoma City, OK (US)

(72) Inventor: Jeremy W. Cramer, Oklahoma City, OK (US)

(*) Notice: Subject to any disclaimer, the term of this patent is extended or adjusted under 35 U.S.C. 154(b) by 384 days.

(21) Appl. No.: 17/338,204

(22) Filed: Jun. 3, 2021

(65) Prior Publication Data

US 2021/0396074 A1     Dec. 23, 2021

Related U.S. Application Data

(60) Provisional application No. 63/042,835, filed on Jun. 23, 2020.

(51) Int. Cl.
    *G02F 1/1335*     (2006.01)
    *G02F 1/1333*     (2006.01)
    (Continued)

(52) U.S. Cl.
    CPC .............. *E06B 9/24* (2013.01); *A01K 1/034* (2013.01); *G02B 27/281* (2013.01);
    (Continued)

(58) Field of Classification Search
CPC ............ G02F 1/1333; G02F 1/133308; G02F 1/1335; G02F 1/133528; G02B 27/281; A01K 1/034; E06B 9/24; E06B 2009/2417
See application file for complete search history.

(56) References Cited

U.S. PATENT DOCUMENTS 9,547,112 B2    1/2017   Mead et al.
10,343,500 B2 *   7/2019   Chander ................... B60J 1/17
(Continued)

FOREIGN PATENT DOCUMENTS

JP          2007145316 A    6/2006
WO   WO 2006/086245 A2    8/2006

OTHER PUBLICATIONS

Midmark Corporation, Midmark webpages, "Boarding + Containment—Midmark Animal" and "Kennel Interlocking System/modular design", retrieved from the internet at https://www.midmark.com/animal-health/products/boarding-containment and at https://www.midmark.com/animal-health/products/boarding-containment/detail/kennel-run-interlocking-system-modular-design, last visited Apr. 25, 2019.

(Continued)

*Primary Examiner* — Thoi V Duong
(74) *Attorney, Agent, or Firm* — Dunlap Codding, P.C.

(57) ABSTRACT

Systems and methods are disclosed for animal containment systems configured to reduce stress, fear, and anxiety experienced by animals being held in animal containment structures by utilizing light filters in the form of orthogonally orientated light-polarization on the front walls of the animal containment structures to control the viewpoints from within and without the animal containment structures, thereby configuring the system to control the animals sight lines, such as allowing the animals to see out of their respective containment structure, but restricting their viewpoint into any other containment structure.

20 Claims, 14 Drawing Sheets

(51) Int. Cl.
   *E06B 9/24*      (2006.01)
   *G02B 27/28*     (2006.01)
   *A01K 1/03*      (2006.01)

(52) U.S. Cl.
   CPC ............... *E06B 2009/2417* (2013.01); *G02F 1/133308* (2013.01); *G02F 1/133528* (2013.01)

(56) References Cited

U.S. PATENT DOCUMENTS

| | | |
|---|---|---|
| 2008/0310021 A1 | 12/2008 | Tillman |
| 2011/0170189 A1 | 7/2011 | Jackson, II |
| 2016/0083997 A1 | 3/2016 | Seamon |

OTHER PUBLICATIONS

Schroer Manufacturing Co., Shor-Line Catalog, 2019-20 Catalog, retrieved from the internet at http://www.shor-line.com/, last visited Apr. 25, 2019.

Tristar Metals Inc., Tristar Vet Kennel Rain Glass Door webpage, retrieved from the internet at https://www.tristarvet.com/product/kennel-door-glass-rain/, last visited Apr. 25, 2019.

Canadian Intellectual Property Office, Examination Report regarding Canadian Patent Application No. 3,123,949; dated Jan. 18, 2023.

\* cited by examiner

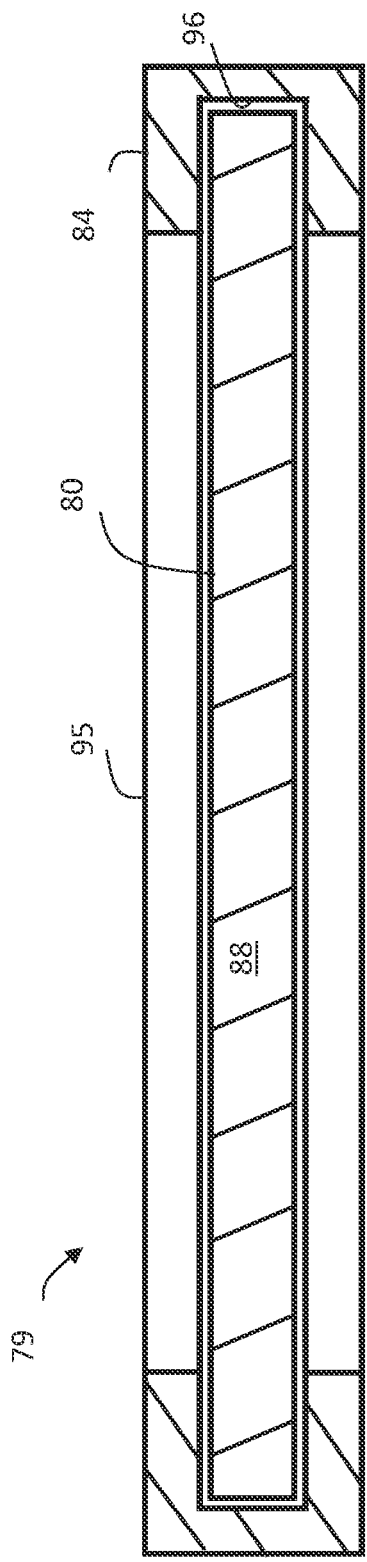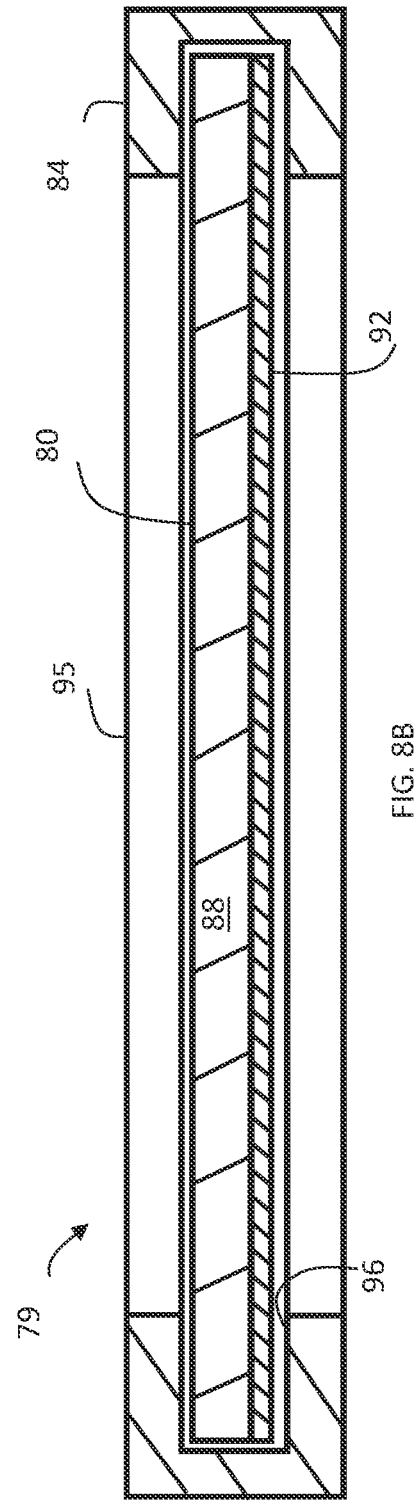

SYSTEM AND METHOD FOR ANIMAL CONTAINMENT WITH LIGHT-POLARIZATION SYSTEM

CROSS-REFERENCE TO RELATED APPLICATIONS

This application claims priority to the provisional patent application identified by U.S. Ser. No. 63/042,835, filed Jun. 23, 2020, titled "Animal Containment System with Polarizer Sections", the entire content of which is hereby expressly incorporated herein by reference.

FIELD OF THE DISCLOSURE

This disclosure generally relates to animal containment systems. More particularly, the disclosure relates to the configuration of kennel sections with light polarization in animal containment systems to control the view of animals contained within the kennels, and thereby decrease stress of the contained animals.

BACKGROUND

Nearly fifty-seven percent of all U.S. households owned a pet at the end of 2016, according to the Pet Ownership and Demographics Sourcebook. The majority of these pets are dogs or cats, with thirty-eight percent of households owning one or more dogs and twenty-five percent of households including at least one cat. These percentages represent the highest estimated rate of pet ownership since the American Veterinary Medical Association began tracking the data in 1982, and many predict the overall pet ownership rate in the U.S. and in other countries is likely to increase in the coming years based on demographic trends.

With the increase in the number of households owning pets, there has also been significant growth in the pet care services industry. For example, the pet daycare and boarding industry has experienced a substantial boom as more and more of these pet owners are opting to put their pets in daycare and boarding facilities while they are away at work or on vacation. These facilities promote the benefits of their services to include providing human interaction, mental stimulation, socialization, and exercise. Unfortunately, these same facilities may also cause a pet to experience detrimental stress, fear, and anxiety due to the current physical structures used to contain the animals as well as the environmental stimuli encountered by the pets.

The need for veterinary services has also increased with the rise in the number of pets. Pets that stay in current veterinary care may also experience additional stress, fear, and anxiety due to the current physical structures used to contain the animals as well as the environmental stimuli encountered by the pets.

Veterinary, daycare, and boarding facilities face problems of minimizing the animals' stress levels while housing multiple animals within a limited amount of physical space. Typically, these facilities want to maximize the number of animals that can be contained separately, or in groups separate from other groups, within the available space. To efficiently use space while maximizing capacity, the containment structures used to isolate the animal(s) from other animals in the facilities are typically positioned in parallel, opposing rows separated by a walkway, with the front sides of the containment structures facing inward toward each other and the walkway. With this arrangement, an animal located within a containment structure typically has a view of the hallway and of other animal(s) contained within the opposing containment structures. Many animals will experience additional pressure, stress, fear, and/or anxiety from viewing other animals. Further adding to the problem, the animals may vocalize in response to stress, pressure, or fear.

Animal vocalization may add stress factors and problems for other animals and the staff at the facilities. For example, many dogs are capable of barking at a sound intensity level of 100-decibel range, which exceeds the Occupational Safety and Health Administration's time-weighted average noise level of 85 decibels for an eight-hour work shift. This noise disturbance can cause lead to hearing damage and increased stress.

Various methods and systems have been previously implemented in an effort to reduce the animals' ability to see other neighboring animals to reduce fear and stress responses. For example, some facilities have installed curtains that hang in corridors between opposing containment structures, which are intended to block the view of the animals. However, these curtains are often burdensome as they block access through the hallways, impede workers from moving, working with, and caring for, the animals in the containment structures, as well as impeding the moving of equipment through the hallways and cleaning the hallways and containment structures.

Other facilities have used containment structures that have opaque surfaces for the lower portion of the front side of the containment structures to block the view of the contained animal, but that have a transparent surface for the upper portion to allow human viewing into the containment area. However, this isolation of the animal has been shown to cause additional stress, fear, and anxiety for the animal by restricting the animal's view to the area within the confines of the containment structure. Further, these types of containment surfaces may result in the animal jumping within the containment area in an effort to see through the transparent portion of the front side, which negates the purpose of the opaque surface. Additionally, jumping could cause the animal to injury itself, cause excessive fatigue, and/or lead to additional anxiety, stress, or fear.

Still other facilities have implemented containment structures with entirely opaque sides, such that the animal within cannot see out at all. However, this isolation of the animal has been shown to cause additional stress, fear, and anxiety for the animal by restricting the animal's view to the area within the confines of the containment structure.

Other facilities use a partially translucent distorting material for the front surface of the containment structure, which allows some light to pass through but which restricts viewing of detailed shapes. One problem with this design is that such material restricts vision in both directions, requiring staff to open the containment structure's door in order to check on the animal. This design may also inadvertently cause more anxiety to the animal because the animal is be able to see an indistinguishable object moving outside of its containment structure, but is not able to identify whether the object is a threat.

What is needed are containment systems that reduces fear, stress, and anxiety in animals, while safely and comfortably containing a plurality of animals within individualized spaces, allowing each animal to see out of their own containment structures when desirable, but blocking the animal from seeing the animals contained within any of the other containment structures when desirable.

SUMMARY

Animal containment structures, systems, and methods of use are disclosed. The problems of animal visibility leading to stress for animals contained within kennels are addressed by utilizing light filters in the form of orthogonally orientated light-polarization system(s) on/in the front walls of the animal containment structures to control the viewpoints from within and without the animal containment structures, thereby allowing configuration of the system to control the animals' sight lines, such as allowing the animals to see out of their respective containment structure, but restricting their viewpoint into one or more other containment structure.

In some aspects of the present disclosure, an animal containment system may comprise a first kennel, comprising: a first front wall having a light polarization panel comprising a first light filter having a first polarization axis and configured to pass visible light waves parallel to the first polarization axis through the first front wall and to block visible light waves not parallel to the first polarization axis; and one or more first surrounding wall constructed of an opaque material and connected to, and cooperating with, the first front wall to form a first animal containment space. The animal containment system may further comprise a second kennel, comprising: a second front wall positioned such that a viewpoint through the second front wall includes the first front wall of the first kennel, the second front wall having a light polarization panel comprising a second light filter having a second polarization axis orthogonal to the first polarization axis, and configured to pass visible light waves parallel to the second polarization axis through the front wall and to block visible light waves not parallel to the second polarization axis; and one or more second surrounding wall constructed of an opaque material and connected to, and cooperating with, the second front wall to form a second animal containment space.

In some aspects of the present disclosure, an animal containment system may comprise a first animal containment structure, which may comprise a first front wall having a transparent portion positioned such that a viewpoint through the transparent portion of the first front wall includes at least a portion of a second front wall of a second animal containment structure; and a removable first light-polarization system attached to the first front wall and covering the transparent portion. The removable light-polarization system may comprise a first retaining member having a sidewall with a length and having two laterally adjacent interior channels along the length; a first polarizing panel removably engaged with a first one of the laterally adjacent interior channels of the first retaining member, the first polarizing panel comprising a first light filter having a first polarization axis; and a second polarizing panel removably engaged with a second one of the laterally adjacent interior channels of the first retaining member, the second polarizing panel comprising a second light filter having a second polarization axis that is orthogonal to the first polarization axis of the first light filter of the first polarizing panel, such that the first light-polarization system blocks visible light waves from entering and leaving the first animal containment structure.

In some aspects of the present disclosure, the animal containment system may further comprise a second animal containment structure, which may comprise a second front wall having a transparent portion; and a second light-polarization system attached to the second front wall and covering the transparent portion. The second light-polarization system may comprise a second retaining member having a sidewall with a length and having one or more interior channels along the length; and a third polarizing panel removably engaged with the one or more interior channels of the second retaining member, the third polarizing panel comprising a third light filter having a third polarization axis. The animal containment system may further comprise a third animal containment structure, which may comprise a third animal containment structure, comprising: a third front wall having a transparent portion positioned such that a viewpoint through the transparent portion of the third front wall includes at least a portion of the second front wall of the second animal containment structure; and a third light-polarization system attached to the third front wall and covering the transparent portion. The third light-polarization system may comprise a third retaining member having a sidewall with a length and having one or more interior channels along the length; and a fourth polarizing panel engaged with the one or more interior channels of the third retaining member, the fourth polarizing panel comprising a fourth light filter having a fourth polarization axis that is orthogonal to the third polarization axis of the second light filter of the second light-polarization system of the second animal containment structure.

In some aspects of the present disclosure, the animal containment structure(s) may further comprise one or more surrounding wall constructed of an opaque material connected to, and cooperating with, the front wall to form an animal containment space.

In some aspects of the present disclosure, the retaining member(s) may have a first side portion, a second side portion laterally opposed from the first side portion, and a bottom portion extending between the first side portion and the second side portion, wherein the first side portion, the second side portion, and the bottom portion cooperate to create a receiving space having an opening opposite the bottom portion for receiving one or more of the first polarizing panel and the second polarizing panel. The bottom portion of the retaining member may have one or more drain holes.

In some aspects of the present disclosure, a method for implementing a kennel system, may comprise removably inserting a first light-polarizing panel within a first one of two laterally adjacent interior channels along a length of a sidewall of a first retaining member of a first light-polarization system attached to a first front wall of a first kennel, thereby covering a transparent portion of the first front wall, the transparent portion positioned such that a viewpoint from within the first kennel through the transparent portion of the first front wall includes at least a portion of a second front wall of a second kennel and such that a viewpoint from within the second kennel includes at least a portion of the first front wall of the first kennel, the first light-polarizing panel comprising a first light filter having a first polarization axis such that wavelength light waves parallel to the first polarization axis pass through the first light filter and such that wavelength light waves perpendicular to the first polarization axis are blocked from passing through the first light filter; and removably inserting a second light-polarizing panel within a second one of the two laterally adjacent interior channels along the length of the sidewall of the first retaining member, the second polarizing panel comprising a second light filter having a second polarization axis such that wavelength light waves parallel to the second polarization axis pass through the second light filter and such that wavelength light waves perpendicular to the second polarization axis are blocked from passing through the second light filter, wherein the second polarization axis is orthogonal to the first polarization axis of the first light filter, such that wavelength light waves that have passed through the first light filter are blocked from passing through the second light filter, and such that wavelength light waves that have passed through the second light filter are blocked from passing through the first light filter, thereby blocking the viewpoint out of and into the first kennel.

In some aspects of the present disclosure, the method for implementing a kennel system may further comprise removably inserting a third light-polarizing panel within an interior channel of a sidewall of a second retaining member of a second light-polarization system attached to a second front wall of the second kennel, thereby covering a transparent portion of the second front wall, the third light-polarizing panel comprising a third light filter having a third polarization axis such that wavelength light waves parallel to the third polarization axis pass through the third light filter and such that wavelength light waves perpendicular to the third polarization axis are blocked from passing through the third light filter; and removably inserting a fourth light-polarizing panel within an interior channel of a sidewall of a third retaining member of a third light-polarization system attached to a third front wall of a third kennel, thereby covering a transparent portion of the third front wall, the transparent portion positioned such that a viewpoint from within the third kennel through the transparent portion of the third front wall includes at least a portion of the second front wall of the second kennel and such that a viewpoint from within the second kennel includes at least a portion of the third front wall of the third kennel, the fourth polarizing panel comprising a fourth light filter having a fourth polarization axis such that wavelength light waves parallel to the fourth polarization axis pass through the fourth light filter and such that wavelength light waves perpendicular to the fourth polarization axis are blocked from passing through the fourth light filter, wherein the fourth polarization axis is orthogonal to the third polarization axis of the third light filter of the third light-polarization system, such that wavelength light waves that have passed through the third light filter are blocked from passing through the fourth light filter, and such that wavelength light waves that have passed through the fourth light filter are blocked from passing through the third light filter, thereby blocking the viewpoint from within the second kennel into the third kennel and blocking the viewpoint from within the third kennel into the second kennel, while maintaining a first view from within the second kennel to outside of the second kennel and maintaining a second view from within the third kennel to outside of the third kennel.

BRIEF DESCRIPTION OF THE SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 8A is a cross-sectional view of an exemplary light-polarization system in accordance with the present disclosure.

FIG. 8B is a cross-sectional view of an exemplary light-polarization system in accordance with the present disclosure.

DETAILED DESCRIPTION

Figure 1:
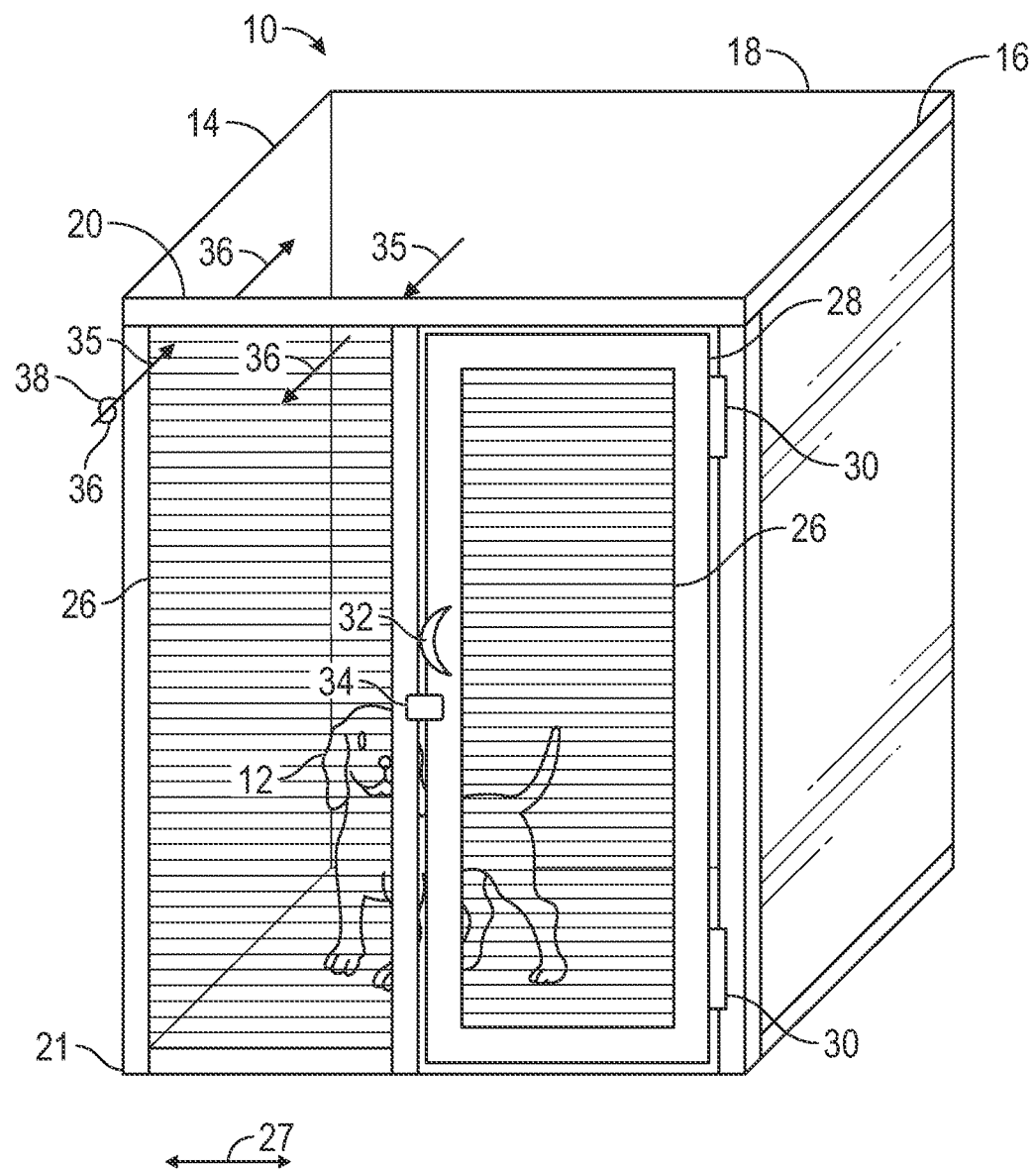
FIG. 1 is a perspective schematic view of an exemplary animal containment structure with a polarizer section of the front side with a vertical polarization axis in accordance with the present disclosure.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the inventive concept, numerous specific details are set forth in order to provide a more thorough understanding of the inventive concept. It will be apparent to one of ordinary skill in the art; however, that the inventive concept within the disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The terms "all" and "completely" when used to describe the filtering of visible light waves will be understood to include 100% of visible light waves, but to also include less than 100% (such as between 90% and 100%) due to manufacturing tolerances, measurement error, wear and tear (including damage), stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIG. 1, shown therein is exemplary embodiment of a first animal containment structure 10. For purposes of clarity, the first animal containment structure 10 may be referred to as a first kennel 10 herein; however, it will be understood that the first animal containment structure 10 may be other types of containment structures used for containing animals 12. Nonexclusive examples of containment structures include cages, rooms, aquariums, crates, and terrariums.

The first kennel 10 may comprise a front wall 20 and one or more surrounding wall, such as a first side wall 14, a second side wall 16, a back wall 18, cooperating together to form an animal containment space. In some implementations, the first kennel 10 and/or the animal containment space may have a substantially cuboid shape. However, it will be understood that the first kennel 10 may comprise more or fewer walls and may have other shapes.

In some implementations, the first side wall 14 may extend between the back wall 18 and the front wall 20. The first side wall 14 may extend vertically from, or from proximate to, a floor surface 21 between the back wall 18 and the front wall 20.

The second side wall 16 may extend between the back wall 18 and the front wall 20. The second side wall 16 may extend vertically from, or from proximate to, the floor surface 21 between the back wall 18 and the front wall 20. In some implementations, the second side wall 16 may be substantially parallel to the first side wall 14.

The back wall 18 may extend between the first side wall 14 and the second side wall 16. The back wall 18 may extend vertically from, or from proximate to, the floor surface 21 between the first side wall 14 and the second side wall 16.

In some implementations, all or portions of the one or more surrounding wall (such as one or more of the first side wall 14, the second side wall 16, and the back wall 18) may be constructed from an opaque material such that the material blocks the transmission of substantially all visible light wavelengths through the material, and/or blocks the view of the animal 12 within the first kennel 10.

The front wall 20 may extend between the first side wall 14 and the second side wall 16. The front wall 20 may extend vertically from, or from proximate to, the floor surface 21 between the first side wall 14 and the second side wall 16.

The front wall 20 may comprise a first door 28 operably attached, such as with one or more first hinges 30. The first door 28 may also include a first handle 32, such as to allow a user to control a position of the first door 28, and/or a latch mechanism 34 such as to fix the first door 28 in a closed position. The size of the first door 28 may vary. For instance, the first door 28 may be more than fifty percent of the front wall 20. In one embodiment, the first door 28 may be a less than fifty percent of the front wall 20. In one embodiment, substantially all of the front wall 20 may act as the first door 28.

The front wall 20 may have one or more first polarizer section 26 having a first polarization axis 27. In one embodiment, as shown in FIG. 1, the front wall 20 may have two or more first polarizer sections 26, each having the first polarization axis 27. The first door 28 may have one or more of the first polarizer sections 26, as shown in FIG. 1.

Although the first polarization axis 27 is depicted in FIG. 1 as substantially horizontal, it would be understood by a person having ordinary skill in the art that the first polarization axis 27 could have any orientation. In one embodiment, a symbol may be included on a surface of the first polarizer section 26 to indicate the orientation of the first polarization axis 27. Nonexclusive examples of the symbol include an arrow, a letter, a number, a word, a graphic, and combinations thereof.

In some implementations, the first polarizer section 26 may be removable and/or addable to the front wall 20 and/or the first door 28. In some implementations, the first polarizer section 26 may be integrated into the structure of the front wall 20 and/or the first door 28.

The one or more first polarizer section 26 may comprise, and/or may be, a first light filter that allows first wavelength light waves 36 of visible light waves 35 that are parallel to the first polarization axis 27 to pass through the one or more first polarizer section 26 from either side of the first polarizer section 26 and to filter (that is, block) second wavelength light waves 38 of visible light waves 35 that are perpendicular to the first polarization axis 27. When the, unpolarized, visible light waves 35 are transmitted through the one or more first polarizer section 26, the first wavelength light waves 36 emerge from the first polarizer section 26 as polarized visible light waves in a single plane that is horizontal (that is, parallel) to the first polarization axis 27, and with half of the intensity of the original, unpolarized, visible light waves 35 (because the second wavelength light waves 38 are blocked).

The polarized light of the first wavelength light waves 36 allows an animal 12 inside the first kennel 10 an unobstructed view through the one or more first polarizer section 26. Likewise, a person outside of the first kennel 10 is provided an unobstructed view into the first kennel 10 through the one or more first polarizer section 26.

The one or more first polarizer section 26 may be constructed from a transparent material such as glass, acrylic, polycarbonate, or other material with structural characteristics to function as a physical barrier while allowing viewing through the material. In some implementations, the transparent material may be the first light filter and may polarize light. Additionally, or alternatively, the first light filter may be a polarized film attached/applied to the transparent material to achieve the polarization of the visible light waves. In some implementations, the first light filter may comprise a chemical compound and/or material composed of molecules that align in parallel relation to one another thereby creating a microscopic filter that absorbs light matching the alignment of the molecules. The creation of polarizer material, in general, is well known to a person having ordinary skill in the art, and as such will not be further explained herein.

Figure 2:
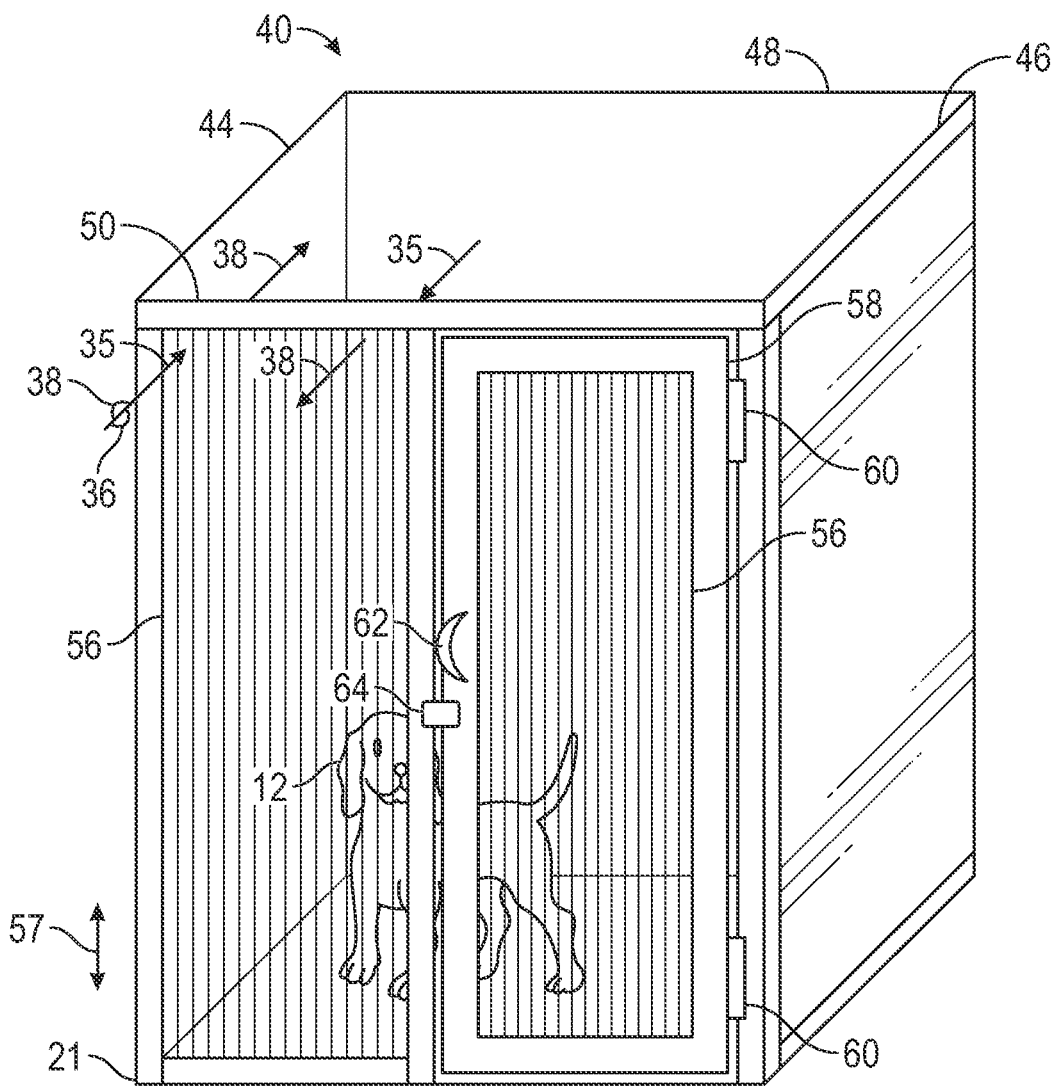
FIG. 2 is a perspective schematic view of another exemplary animal containment structure with a polarizer section of the front side with a horizontal polarization axis in accordance with the present disclosure.

Referring now to FIG. 2, shown therein is exemplary embodiment of a second animal containment structure 40. For purposes of clarity, the second animal containment structure 40 may be referred to as a second kennel 40 herein; however, it will be understood that the second animal containment structure 40 may be other types of containment structures used for containing animals. Nonexclusive examples of containment structures include cages, rooms, aquariums, crates, and terrariums.

The second kennel 40 may comprise and a front wall 50 and one or more surrounding wall, such as a first side wall 44, a second side wall 46, a back wall 48, cooperating together to form an animal containment space. The second kennel 40 and/or the animal containment space may have a substantially cuboid shape. However, it will be understood that the first kennel 10 may comprise more or fewer walls and may have other shapes.

In some implementations, the first side wall 44 may extend between the back wall 48 and the front wall 50. In one embodiment, the first side wall 44 may extend vertically from, or from proximate to, the floor surface 21 between the back wall 48 and the front wall 50.

The second side wall 46 may extend between the back wall 48 and the front wall 50. The second side wall 46 may extend vertically from, or from proximate to, the floor surface 21 between the back wall 48 and the front wall 50. In one embodiment, the second side wall 46 may be substantially parallel to the first side wall 44.

The back wall 48 may extend between the first side wall 44 and the second side wall 46. The back wall 48 may extend vertically from, or from proximate to, the floor surface 21 between the first side wall 44 and the second side wall 46.

The first side wall 44, the second side wall 46, and the back wall 48 may be constructed from an opaque material, such that the material blocks the transmission of substantially all light through the material and/or blocks the view of an animal within the second kennel 40.

The front wall 50 may extend between the first side wall 44 and the second side wall 46. The front wall 50 may extend vertically from, or from proximate to, the floor surface 21 between the first side wall 44 and the second side wall 46. The front wall 50 of the second kennel 40 may comprise a second door 58 operably attached with one or more second hinges 60. The second door 58 may also include a second handle 62, to allow a user to control a position of the second door 58, and a second latch mechanism 64 to fix the second door 58 in a closed position. The size of the second door 58 may vary. For instance, the second door 58 may be more than fifty percent of the front wall 50. In one embodiment, the second door 58 may be less than fifty percent of the front wall 50. In one embodiment, substantially all of the front wall 50 may act as the second door 58.

The front wall 50 may have one or more second polarizer section 56 having a second polarization axis 57. The second polarization axis 57 is orthogonal to the first polarization axis 27. Although FIG. 2 depicts the second polarization axis 57 as a vertical polarization axis, the second polarization axis 57 may be positioned at any angle as long as the second polarization axis 57 is in a ninety-degree relationship with the first polarization axis 27. In one embodiment, a symbol may be included on a surface of the second polarizer section 56 to indicate to the user the orientation of the second polarization axis. Non-exclusive examples of the symbol include an arrow, a letter, a number, a word, a graphic, and combinations thereof.

In one embodiment, the front wall 50 may have two or more second polarizer sections 56, each having the second polarization axis 57. The second door 28 may have one or more of the second polarizer sections 56, as shown in FIG. 2.

In some implementations, the second polarizer section 56 may be removable and/or addable to the front wall 50 and/or the second door 58. In some implementations, the second polarizer section 26 may be integrated into the structure of the front wall 50 and/or the second door 58.

The one or more second polarizer section 56 may comprise, and/or may be, a second light filter that allows the second wavelength light waves 38 of the visible light waves 35 that are parallel to the second polarization axis 57 to pass through the one or more second polarizer section 56 from either side of the second polarizer section 56, and to filter (that is, block) the first wavelength light waves 36 of the visible light waves 35 that are perpendicular to the second polarization axis 57. When the unpolarized, visible light waves 35 are transmitted through the one or more second polarizer section 56, the second wavelength light waves 38 emerges only as polarized light in a horizontal plane from the second polarization axis 57, and with half of the intensity of the original light waves.

The polarized light allows an animal 12 inside the second kennel 40 an unobstructed view of an exterior environment through the one or more second polarizer section 56. Likewise, a person outside of the second kennel 40 is provided an unobstructed view into the second kennel 40 through the one or more second polarizer section 56.

The one or more second polarizer section 56 may be constructed from a transparent material such as glass, acrylic, polycarbonate, or other material with structural characteristics to function as a physical barrier while allowing viewing through the material. In some implementations, the transparent material may be the second light filter and may polarize light. Additionally, or alternatively, the second light filter may be a polarized film attached/applied to the transparent material to achieve the polarization of the visible light waves. In some implementations, the second light filter may comprise a chemical compound and/or material composed of molecules that align in parallel relation to one another thereby creating a microscopic filter that absorbs light matching the alignment of the molecules. The creation of polarizer material, in general, is well known to a person having ordinary skill in the art, and as such will not be further explained herein.

Figure 3:
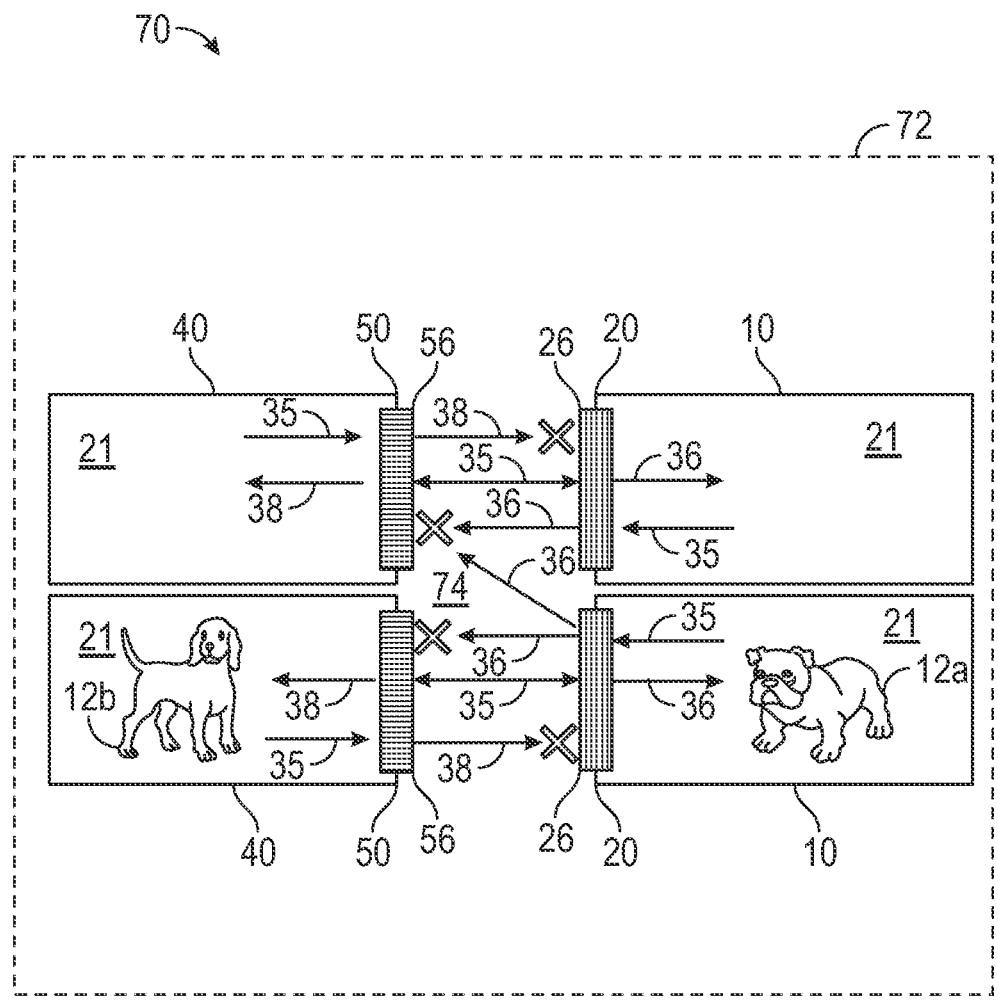
FIG. 3 is a top plan schematic view of an exemplary animal containment system in accordance with the present disclosure.

FIG. 3 depicts a top plan schematic view of an exemplary animal containment system 70. The animal containment system 70 may comprise one or more of the first kennels 10 and one or more of the second kennels 40 arranged in a defined space 72 such that the front wall 20 of the one or more first kennels 10 is facing, and/or has a viewpoint of, the front wall 50 of the one or more second kennels 40. In some implementations, the front wall(s) 20 of the one or more first kennels 10 may be aligned directly across from the front wall(s) 50 of the one or more second kennels 40. Additionally, or alternatively, the front wall(s) 20 of the one or more first kennels 10 may be horizontally across from, but laterally offset from, the front wall(s) 50 of the one or more second kennel(s) 40. The first kennels 10 and the second kennels 40 may be aligned in other relationships such that, if unobscured, a sightline is established through the front wall(s) 20 of the first kennels 10 into the front wall(s) 50 of the second kennels 40, and vice versa. It will be understood that this may also apply to the first door 28 and the second door 58, in implementations in which the first door 28 and/or the second door 58 have first and/or second polarizer sections 26, 56.

The defined space 72 may represent an animal day care facility, a veterinary office, a pet store, a zoo, or any location that may contain a plurality of animals for a period of time.

FIG. 3 illustrates the animal containment system 70 comprising two of the first kennels 10 aligned adjacent to one another and across from two of the second kennels 40 aligned adjacent to one another for exemplary purposes. However, it will be understood that the animal containment system 70 may comprise any number of at least one first kennel 10 and at least one second kennel 40, such as one first kennel 10 across from one second kennel 40, three or more first kennel 10 across from one second kennel 40, and so on, which may be positioned in the similarly to the example shown or positioned in other relationships.

In FIG. 3, the one or more first kennels 10 in relationship to (such as across from) the one or more second kennels 40 may cooperate to form a corridor 74 between the first and second kennels 10, 40. The corridor 74 between the first and second kennels 10, 40 may have a width configured to permit a person with an animal 12 to pass through the corridor 74. For example, the corridor 74 may have a width of at least four feet. The corridor 74 may have a width configured to allow the first or second doors 28, 58 to open without interference with any other component of the animal containment system 70. For example, the corridor 74 may be wider than the length of the first door 28 plus the length of the second door 58. However, the width of the corridor 74 may be minimized within safety and usability constraints so as to maximize the layout of the first and second kennels 10, 40 and the animal containment system 70. For example, the width of the corridor 74 may be between approximately three and four feet.

In one embodiment, the second side wall 16 of one first kennel 10 and the first side wall 14 of an adjacent first kennel 10 may be separated and may cooperate to form another corridor. Similarly, the distance between the first side wall 44 of one second kennel 40 and the second side wall 46 of another second kennel 40 may be separated and may cooperate to form another corridor.

In one embodiment of the animal containment system 70, adjacent ones of the first kennels 10 may share a side wall. For example, a single side wall may be the first side wall 14 for one first kennel 10 and the second side wall 16 for an adjacent first kennel 10. Likewise, adjacent ones of the second kennels 40 may share a side wall. For example, a single side wall acts may be the first side wall 44 for one second kennel 40 and the second side wall 46 for an adjacent second kennel 40.

In one embodiment, the back walls 18 of adjacent ones of the first kennels 10 need not be aligned. Similarly, the front walls 20 of adjacent ones of the first kennels 10 may not be aligned. In some implementations, adjacent ones of the first kennels 10 may share the back wall 18 and/or the front wall 20. The dimensions of any one of the first kennels 10 may vary from the dimensions of any other one of the first kennel 10 depending upon the needs of the facility having the animal containment system 70.

In one embodiment, the back walls 48 of adjacent ones of the second kennels 40 need not be aligned. Similarly, the front walls 50 of adjacent ones of the second kennels 40 may not be aligned. In some implementations, adjacent ones of the second kennels 40 may share the back wall 48 and/or the front wall 50. The dimensions of any one of the second kennels 40 may vary from the dimensions of any other one of the second kennels 40 depending upon the needs of the facility having the animal containment system 70.

The position of the first kennels 10 on one side of the corridor 74 and the second kennels 40 on the other side of the corridor 74, with the front wall(s) 20 of the first kennels 10 and the front wall(s) 50 of the second kennels both facing the corridor 74, allows a person standing in the corridor 74 to see into both the first kennels 10 and the second kennels 40.

The first polarizer section 26 allows the first wavelength light waves 36 of the visible light waves 35 emanating from within and/or without the first kennel 10 that are parallel to the first polarization axis 27 to pass through the first polarizer section 26 (as polarized light), between the interior of the first kennel 10 and the corridor 74, such that a first animal 12a within the first kennel 10 can see into the corridor 74 and that a person in the corridor 74 can see into the first kennel 10 through the first polarizer section 26.

The second polarizer section 56 allows the second wavelength light waves 38 of the visible light waves 35 emanating from within and/or without the second kennel 40 that are parallel to the second polarization axis 57 to pass through the second polarizer section 56 (as polarized light), between the interior of the second kennel 40 and the corridor 74, such that a second animal 12b within the second kennel 40 can see into the corridor 74 and that a person in the corridor 74 can see into the second kennel 40 through second polarizer section 56.

However, the orthogonal relationship between the first polarization axis 27 of the first polarizer section 26 and the second polarization axis 57 of the second transparent polarizer section 56 causes the first and second wavelength light waves 36, 38 to be blocked from traveling between the interior of the first kennel 10 and the interior of the second kennel 40.

As such, the first polarizer section 26 allows the first animal 12a in the first kennel 10 to see into the corridor 74 and to see the front wall 50 of the second kennel 40; however, the second polarizer section 56 of the second kennel 40 appears as a solid dark area to the animal in the first kennel 10, since the second wavelength light waves 38 emanating from within the second kennel 40 are in a perpendicular plane to the first polarization axis 27 of the first polarizer section 26 of the first kennel 10 and are therefore blocked by the first polarizer section 26.

Likewise, the second polarizer section 26 allows the second animal 12b in the second kennel 40 to see the into the corridor 74 and to see the front wall 20 of the first kennel 10; however, the first polarizer section 26 of the first kennel 10 appears as a solid dark area to the second animal 12b in the second kennel 40, since the first wavelength light waves 36 emanating from within the first kennel 10 are in a perpendicular plane to the second polarization axis 57 of the second polarizer section 56, and are thus blocked by the second polarizer section 56.

In some implementations, the placement and orientation of the first kennel 10 and the second kennel 40 may be in any location within the defined space 72 of the animal containment system 70, as long as the first polarization axis 27 of the first polarizer section 26 of the first kennel 10 is in an orthogonal relationship with the second polarization axis 57 of the second polarizer section 56 of the second kennel 40, such that light is blocked from passing between the interior of the first kennel 10 and the second kennel 40, resulting in the blocked views of the first and second animals 12a, 12b into the second and first kennels 10, 40.

Figure 4:
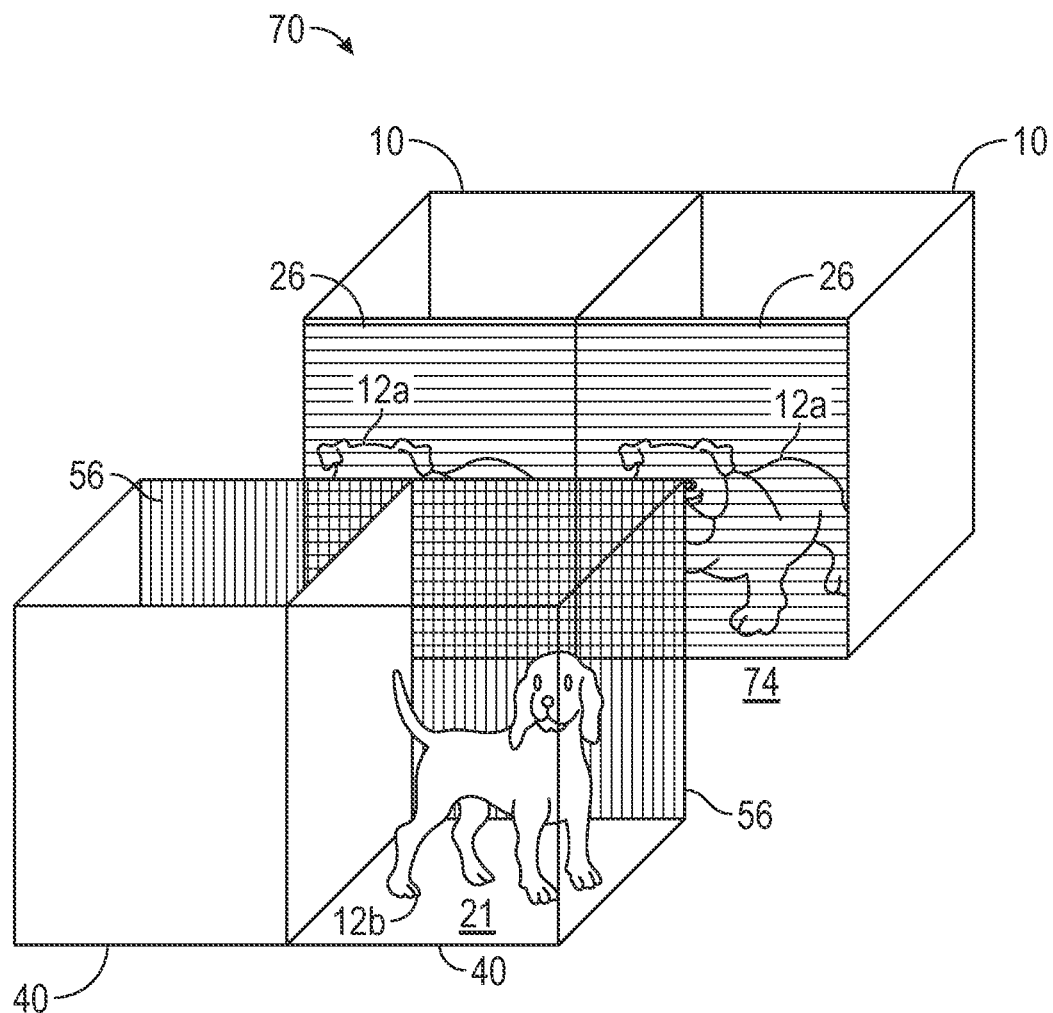
FIG. 4 is a perspective schematic view of the animal containment system of FIG. 3.

FIG. 4 illustrates a perspective schematic view of an implementation of the animal containment system 70. For explanatory purposes, the first side wall 44 and the back wall 48 of one of the second kennels 40 are not depicted, in order to illustrate the view through the second polarizer section 56 from within that second kennel 40. In this example, the first kennels 10 have front walls 20 with first polarizer sections 26 having a substantially vertical first polarization axis 27 and the second kennels 40 have front walls 50 with second polarizer sections 56 having a substantially horizontal second polarization axis 57 (orthogonal to the vertical polarization axis). Therefore, the second animal 12b within the second kennel 40 is able to see the corridor 74 and the external structure of the first kennel 10, but is unable to see into the first kennels 10 or the first animals 12a contained within the first kennels 10. However, the first animals 12a in the first kennels 10 can be seen clearly when looking through the first polarizer section 26 alone (such as from the corridor 74), and the second animals 12b in the second kennels 40 can be seen clearly when looking through the second polarizer section 56 alone, such as from the corridor 74.

Figure 5:
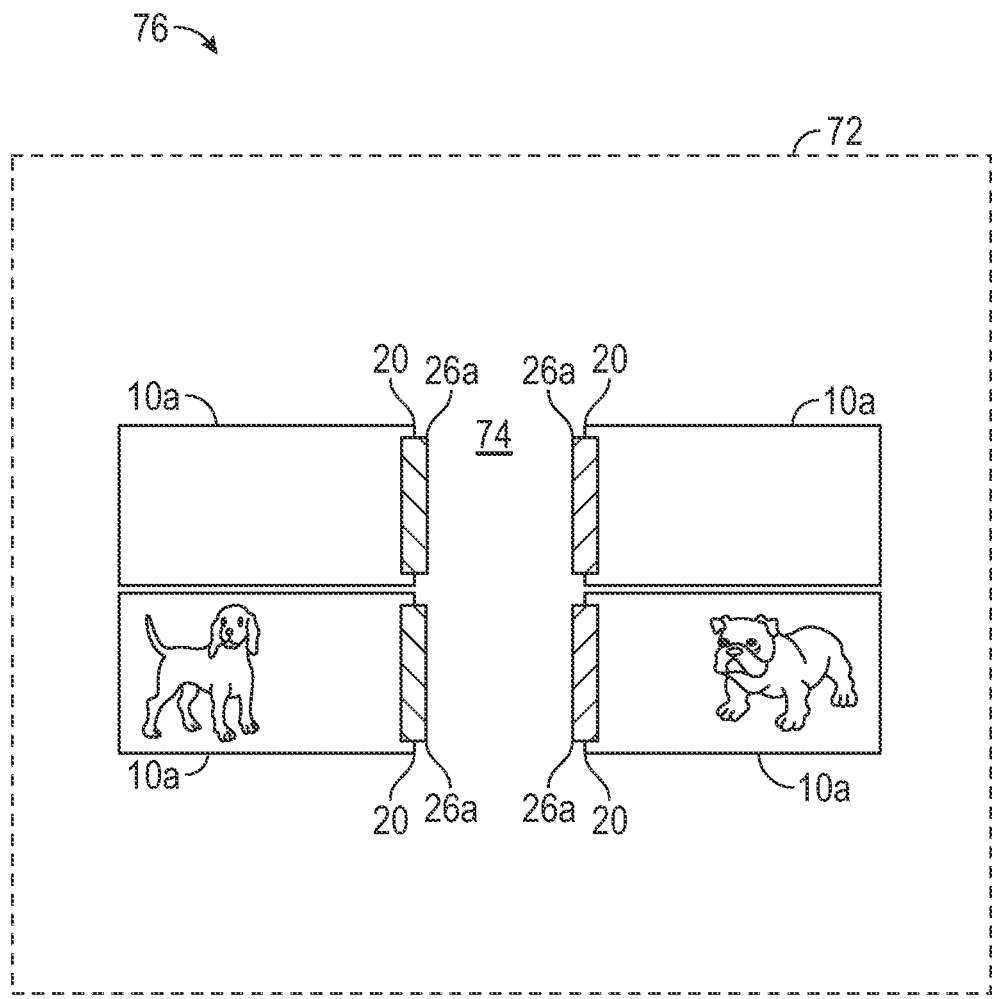
FIG. 5 is a top plan schematic view of another exemplary animal containment system in accordance with the present disclosure.

FIG. 5 depicts a top plan schematic view of another exemplary an animal containment system 76 in which a first polarizer section 26a of a first kennel 10a may have a first polarization axis 27a with a 45-degree orientation with respect to a horizontal or vertical plane. In the animal containment system 76, a first one of the first kennel 10 may be placed within the defined space 72 facing and opposing a second one of the first kennel 10a (that is, such that the front wall 20 of the first one of the first kennel 10 has a viewpoint of the front wall 20 of the second one of the first kennel 10a), such that the first polarization axis 27a of the first polarizer section 26a of the first one of the first kennel 10a is in an orthogonal relationship to the first polarization axis 27a of the second one of the first kennel 10a. Therefore, the second animal 12b within the second one of the first kennel 10a is able to see the corridor 74 and the external structure of the first one of the first kennel 10a, but is unable to see into the first one of the first kennels 10a or the first animals 12a contained within the first kennels 10. However, the first animals 12a in the first ones of the first kennels 10a can be seen clearly when looking through the first polarizer section 26a alone (such as from the corridor 74), and the second animals 12b in the second one of the second kennels 10a can be seen clearly when looking through the first polarizer section 26a alone, such as from the corridor 74.

Figure 6:
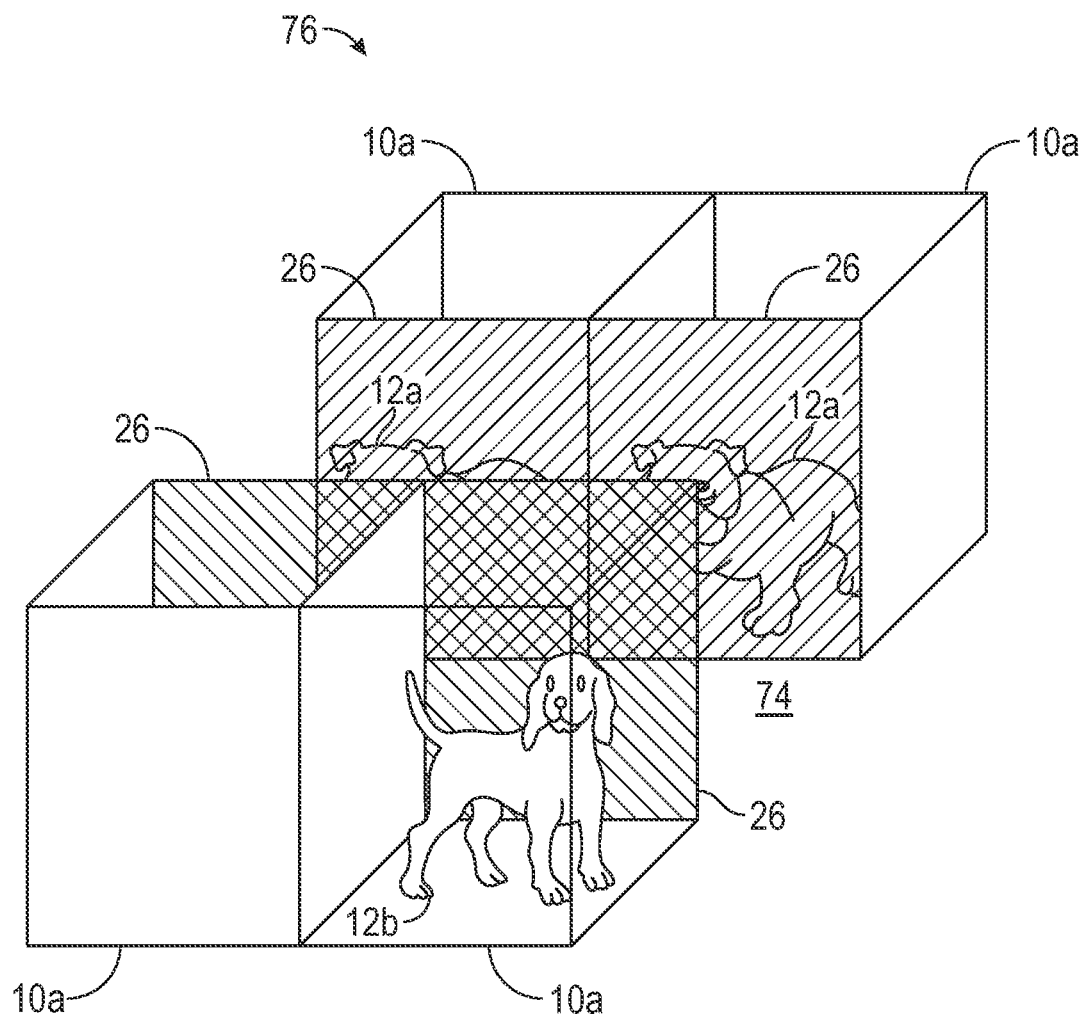
FIG. 6 is a perspective schematic view of the animal containment system of FIG. 5.

FIG. 6 illustrates a perspective schematic view of the implementation of the animal containment system 76 of FIG. 6. The first side wall 14 and the back wall 18 of the first one of the first kennel 10a are not depicted in order to illustrate the view through the first polarizer section 26 from within the first one of the first kennel 10a. In this example, the first polarization axes 27a of the first polarizer sections 26a are orientated to a 45-degree angle with respect to the horizontal or vertical plane, such that, when the polarizer sections 26a are positioned to face one another, light waves are blocked from moving between the interior of the first one of the first kennel 10a on a first side and the interior of the second one of the first kennel 10a on the opposing side. Therefore, the first and second animals 12a, 12b within the first kennels 10a are able to see into the corridor 74 and the external structure of the opposing first kennels 10a, but are unable to see into the other first kennels 10a or the animal 12 contained within the other first kennel 10a, since the orthogonal relationship between the opposing first polarizer sections 26a (i.e., one having a 45-degree angle to the right from a vertical plane and the other having a 45-degree angle to the left from a vertical plane) blocks the light waves from moving through both opposing first polarizer sections 26a.

Non-exclusive examples of the animal containment systems 70, 76 in use will now be described. In use, a user may determine orientation of the first and second polarization axes 27, 57 of the first and second polarizer sections 26, 56 of the first and second kennels 10, 40. The user may position the first and second kennels 10, 40 within the defined space 72 such that the first and second polarizer sections 26, 56 prevent the transmission of visual light waves between the interiors of the first and second kennels 10, 40, as explained below.

For example, an animal day care facility may position several first and second kennels 10, 40 in a defined space 72, such as a room within the facility. Before positioning the first and second kennels 10, 40 a person may identify the polarization axis, or axes, of the first and second polarizer sections 26, 56, of the front walls 20, 50, of the first and second kennels 10, 40. For example, the first kennels 10 may have a vertical polarization axis while the second kennels 40 may have a horizontal polarization axis.

In one embodiment, the first kennels 10 may be aligned in a row with the first and second side walls 14, 16 of the neighboring first kennels 10, spaced apart, in physical contact with each other, or sharing internal side walls, as previously described. In one embodiment, the first kennels 10 may be positioned with the back walls 18 against a room wall and the front walls 20 facing an opposite room wall. Opposite and across from the row of first kennels 10, a row of second kennels 40 may be aligned side-by-side with the front walls 50 of the second kennels 40 facing the front walls 20 of the first kennels 10. The defined space 72 in which the first and second kennels 10, 40 are positioned may be large enough to allow a sufficient space between the rows of first and second kennels 10, 40 to form the corridor 74 for human and animal traffic. It will be understood that other rows of first and second kennels 10, 40 may also be used within the defined space 42. For example, another second set of first kennels 10 may be positioned such that the back walls 18 of the second set of first kennels 10 faces, or abuts, or shares structure with, the back walls 48 of the second kennels 40. Other combinations of rows and sequences of kennels 10, 40 are contemplated with the defined space 42, as long as the relationship between the first and second polarization axes 27, 57 of the first and second polarizer sections 26, 56 of the front walls 20, 50 of the first and second kennels 10, 40 remains orthogonal, thereby blocking light waves from passing between the interiors of the first kennels 10 and the second kennels 40.

In one exemplary usage, a person may enter the room and access the corridor 74 with an animal 12. The person may open the first door 28 located on one of the first kennels 10 and place the animal inside the first kennel 10 before securing the first door 28 with the latch mechanism 34. The person may continue the process of placing the animal(s) 12 in the neighboring and opposing first and second kennels 10, 40.

As the person enters into the room and corridor 74, she is able monitor the well-being of the animals 12 contained within the first or second kennels 10, 40 through the first or second transparent polarizer sections 26, 56. The first transparent polarized section 26 allows the polarized visible first wavelength light waves 36 in a first plane (such as a vertical plane) to pass, while the second transparent polarizer section 56 allows polarized visible second light wavelength waves 38 in an orthogonal plane to the first plane (such as a horizontal plane) to pass. The animals 12 will also be able to see the person through the first or second transparent polarizer sections 26, 56. Therefore, the stress and fear levels of the animals 12 may be reduced because of the open and less confining kennels, because they are able to see out into the corridor 74 and the people therein.

As illustrated in FIG. 3, when the animals 12 are in the first kennels 10 they are unable to see the animals 12 in the second kennels 40 and vice versa. Visible light waves 35 from the interior of the first kennels 10 are filtered, blocking second light wavelength waves 38 from the second kennel 40 from being transmitted through the first transparent polarized sections 26 into the first kennel 10, and visible light waves 35 from the interior of the second kennels 40 are filtered, blocking first light wavelength waves 36 from the first kennel 10 from being transmitted through the second transparent polarizer sections 56 into the second kennel 40. Therefore, stress and fear levels of the animals 12 may be reduced since they are able to see out into the corridor 74 and the people therein, but they are unable to see the other animals 12 contained in the opposing kennels.

In another example, a veterinary office or other facility may install a number of first kennels 10a in which the first polarizer sections 26a have a first polarization axis 27a that is orientated with a 45-degree axis to the horizontal or vertical plane. The facility may position the first kennels 10a within the defined space 72 such that the first polarization axis 27a of a first one of the first kennels 10a is in an orthogonal relationship with the first polarization axis 27a of a second one of the first kennels 10a. The first polarization axis 27a of the first polarizer sections 26a maintains an orthogonal relationship to the first polarization axis 27a of other first polarizer sections 26a across from it, without having to check horizontal or vertical orientation, since opposing 45-degree orientations are orthogonal to one another. This configuration provides the same visual effects as in the previous example. The veterinary staff is able to see the interior of the first kennels 10a because light wave wavelengths parallel to the first polarization axis 27a are transmitted through the polarizer sections 26a. The animals 12 in the first kennels 10a are not able to see the animals 12a in other first kennels 10a having an orthogonal polarization axis, since the combination of the orthogonally-positioned axes of the first one of the first kennels 10a and the second one of the first kennels 10a blocks visible light waves 35 from transmission.

In either example above, it may be possible to add a polarized film to transparent surfaces of existing animal containment structures 10. For instance, if the veterinary office or other facility already includes a plurality of animal containment structures with front walls 20 that include a transparent section, then the polarized film may be attached to the front wall 20. In one embodiment, one side of the polarized film may be coated with an adhesive that allows the polarized film to be attached to the transparent section of the front wall. In one embodiment, the film may be statically attached. When installing the polarized film, the polarization axis of each installed polarized film is applied such that an orthogonal relationship is established between opposing containment structures. In some cases, the front wall of an existing animal containment structure may be replaced with a front wall 20 that includes the polarizer section 26.

Figure 7:
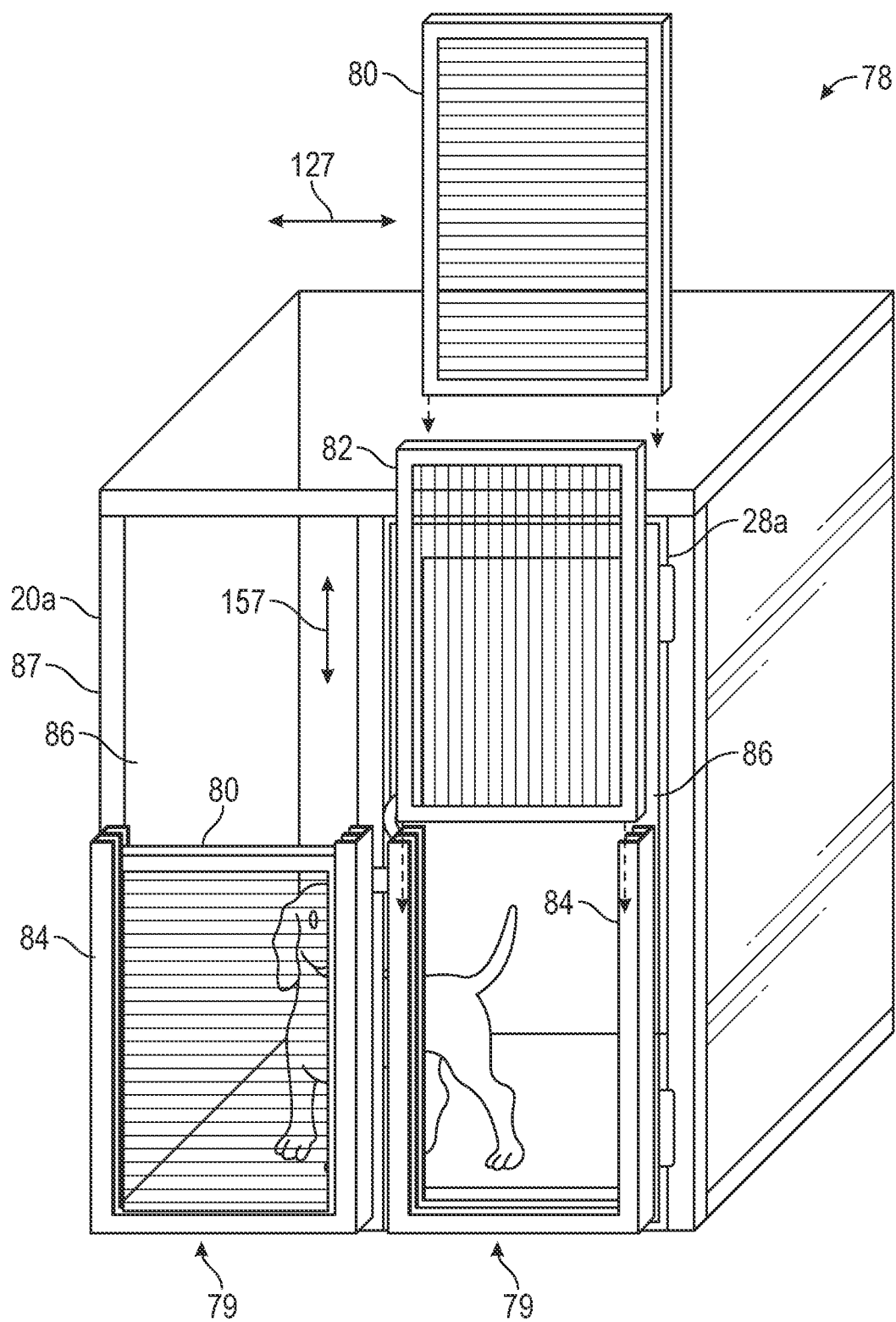
FIG. 7 is a perspective, partially exploded, schematic view of another exemplary animal containment structure in accordance with the present disclosure.

FIG. 7 illustrates another embodiment of an animal containment structure 78 constructed in accordance with the inventive concepts disclosed herein. The animal containment structure 78 is similar in use and construction to the first and second animal containment structures 10, 40 except as described below.

In place of (or in addition to) the first and second polarizer sections 26, 56, the animal containment structure 78 may include one or more light-polarization system 79 configured to filter some or all visible light waves 35 into and out of the animal containment structure 78.

Figure 11:
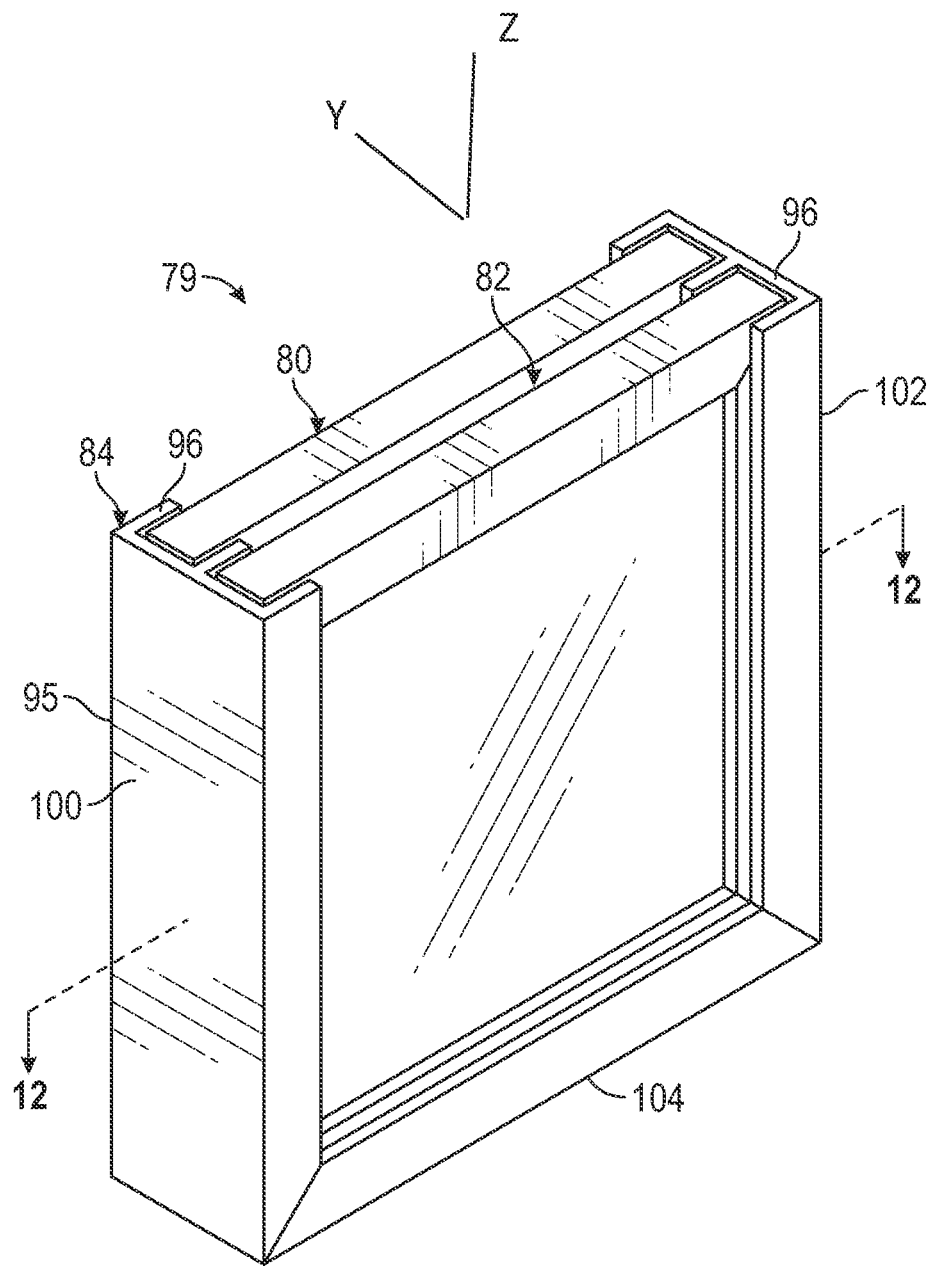
FIG. 11 is a perspective view of an exemplary light-polarization system in accordance with the present disclosure.
Figure 12:
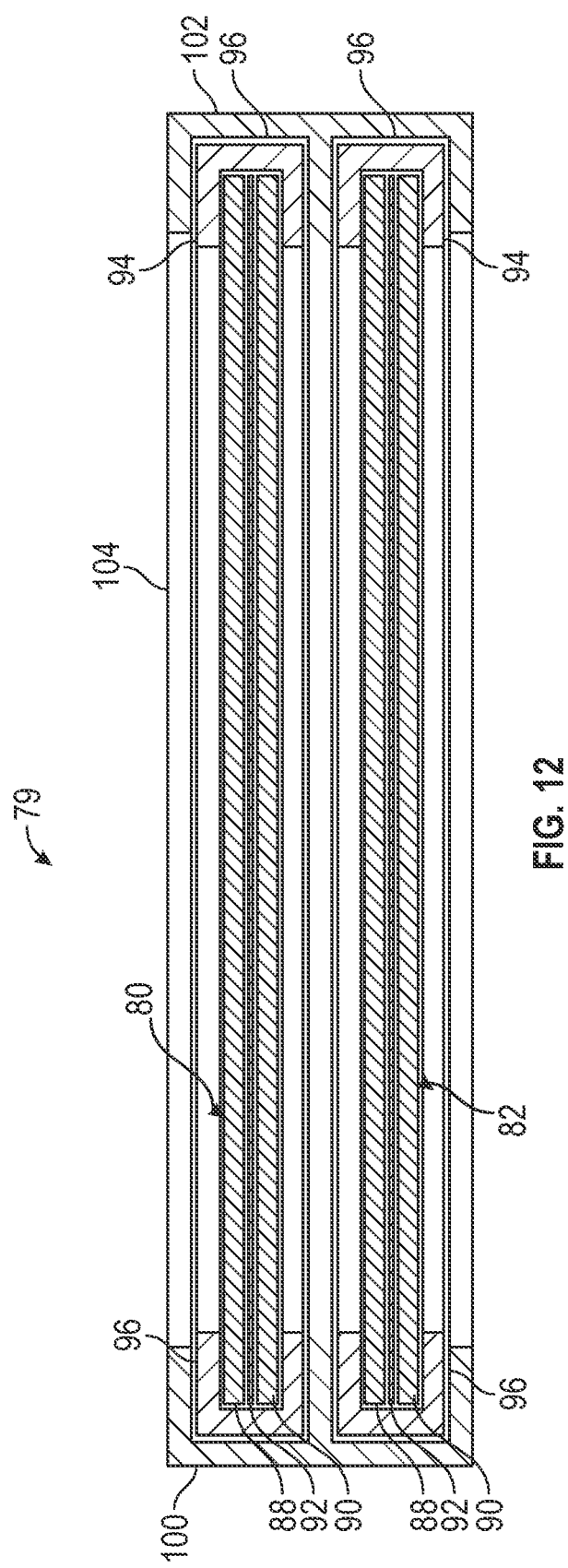
FIG. 12 is a cross-sectional view of the light-polarization system of FIG. 11.

As shown in FIGS. 7, 8, 8A, and 8B, the light-polarization system 79 may comprise a first polarizing panel 80 engageable with a retaining member 84. In some implementations, as shown in FIGS. 7, 11, and 12, the light-polarization system 79 may further comprise a second polarizing panel 82 engageable with the retaining member 84.

The retaining member 84 may be attachable and/or fixed to the animal containment structure 78, such as to the front wall 20a of the animal containment structure 78, and may be configured to receive and support the first polarizing panel 80 and/or the second polarizing panel 82. In use, the light-polarization system 79 at least partially restricts visible light waves 35 through at least part of the front wall 20, 20a, such as through an opening in the front wall 20a and/or through a transparent portion of the front wall 20a, for example, one or more transparent section(s) 86.

Figure 8:
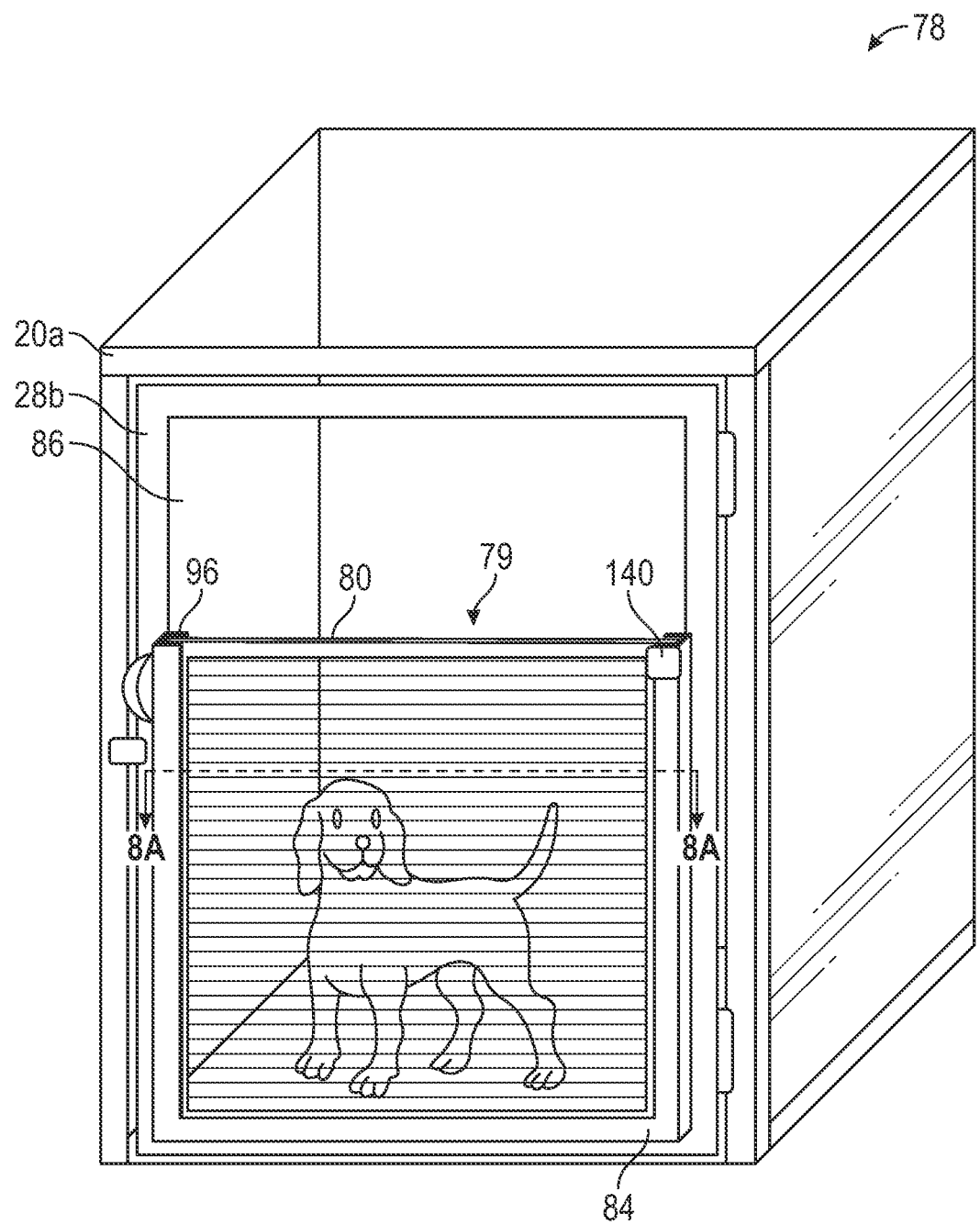
FIG. 8 is a perspective view of another exemplary animal containment structure in accordance with the present disclosure.

Returning to FIGS. 7 and 8, the front wall 20a of the animal containment structure 78 may include transparent portions such as the one or more transparent sections 86. The transparent sections 86 may be a physical barrier for the animal containment structure 78, while allowing viewing through the surface. Nonexclusive examples of the transparent section 86 include glass, tempered glass, wire frame, wire mesh, plexiglass, and clear acrylic or other clear plastic. In the example shown in FIG. 7, the front wall 20a has a door 28a and has a wall panel 87 positioned in-line with, and adjacent to, the door 28a. The front wall 20a may have two transparent sections 86, such as one transparent section 86 associated with the door 28a and one transparent section 86 associated with the wall panel 87. In another example, as shown in FIG. 8, the front wall 20a has a door 28b and has one transparent section 86 associated with the door 28b.

Though the light-polarization system 79 is shown partially covering the transparent section(s) in the figures for explanatory purposes, the light-polarization system may more fully or completely cover one or more of the transparent section(s) 86 and/or an opening in the animal containment structure 78.

In some implementations, the retaining member 84 may be directly attached to the front wall 20 of the animal containment structure 78, attached to the transparent section 86, and/or attached proximate to the transparent section 86. The retaining member 84 may be attached with fasteners (such as bolts, screws, claims, welds, and so on), and/or adhesives, or the like. In one embodiment, the front wall 20*a* may be constructed to integrally or removably include the retaining member 84 at the time of fabrication of the animal containment structure 78.

The first polarizing panel 80 and the second polarizing panel 82 may each comprise a light filter and may be constructed from a transparent material such as glass, acrylic, polycarbonate, or other material with structural characteristics to function as a physical barrier while allowing viewing through the material. In some implementations, as shown in FIG. 8A, the transparent material may be the light filter and may polarize light. Additionally, or alternatively, the light filter may be a light-polarizing film 92 attached/applied to the transparent material to achieve the polarization of the visible light waves 35, as shown in FIG. 8B. In some implementations, the light filter may comprise a chemical compound and/or material composed of molecules that align in parallel relation to one another thereby creating a microscopic filter that absorbs light matching the alignment of the molecules. The creation of light-polarization material, in general, is well known to a person having ordinary skill in the art, and as such will not be further explained herein.

In some implementations, as shown in FIGS. 8B and 12, the first polarizing panel 80 and/or the second polarizing panel 82 may comprise a first transparent member 88 and the light-polarizing film 92. As shown in FIG. 12, the first polarizing panel 80 and/or the second polarizing panel 82 may further comprise a second transparent member 90. In some implementations, as shown in FIGS. 11 and 12, each of the first and second polarizing panels 80, 82 may further comprise a frame 94 supporting one or more of the first transparent member 88, the second transparent member 90, and the light-polarizing film 92, though it will be understood that the frame 94 may be optional. The first transparent member 88 and the second transparent member 90 may be constructed from transparent material having structural characteristics to support and protect the light-polarizing film 92 while allowing light to pass through the material.

In some implementations, the light-polarizing film 92 may adhere to and/or be attached to the first transparent member 88. The first transparent member may have a planar surface and the light-polarizing film 92 may be adhered to and/or attached to the planar surface of the first transparent member 88. Additionally, or alternatively, the light-polarizing film 92 may be interposed between the first transparent member 88 and the second transparent member 90, as shown in FIG. 12. The second transparent member 90 may have a planar surface. The light-polarizing film 92 may be interposed between the first planar surface of the first transparent member 88 and the second planar surface of the second transparent member 90. The light-polarizing film 92 may be fixed, and/or fixable, to one, or both, of the first transparent member 88 and the second transparent member 90, such as with adhesive or via static electricity.

In some implementations, the light-polarizing film 92 may be interposed between the first transparent member 88 and the second transparent member 90 and the frame 94 may extend around the perimeter of the first transparent member 88 and the second transparent member 90 thereby secure the light-polarizing film 92 in place. The frame 94 may hold the first transparent member 88 against the second transparent member 90 such that the edges of the first transparent member 88 are aligned with the edges of the second transparent member 90. The frame 94 may be partially wrapped around the edges of the first transparent member 88 and the second transparent member 90 to maintain structural integrity of the frame 94, as well as providing protection of edges of the first transparent member 88 and/or the second transparent member 90 from damage.

As shown in FIG. 7, the first polarizing panel 80 may have a first polarization axis 127 and the second polarizing panel 82 may have a second polarization axis 157.

In some implementations, the first and second polarizing panels 80, 82 may be orientated in relation to one another within one or more of the retaining members 84 to orientate the first polarization axis 127 of the first polarizing panel 80 in relation to the second polarization axis 157 of the second polarizing panel 82. For example, the second polarization axis 157 of the second polarizing panel 82 may be orientated to be orthogonal to the first polarization axis 127 of the first polarizing panel 80 so as to filter all the visible light waves 35 from passing through the light-polarization system 79. In some implementations, the orientation of the first polarization axis 127 of the first polarizing panel 80 is orthogonal to the second polarization axis 157 of the second polarizing panel 82 when the first polarizing panel 80 and the second polarizing panel 82 are within one or more of the retaining member(s) 84. The first polarizing panel 80 and the second polarizing panel 82 may be removably engaged with the retaining member 84 such that the first polarizing panel 80 and/or the second polarizing panel 82 may be added or removed from the retaining member(s) 84 to achieve the desired light filtration.

Though the first polarization axis 127 is shown in FIG. 7 to be horizontal and the second polarization axis 157 is shown to be vertical, the first polarization axis 127 and the second polarization axis 157 may be any orientation. For complete filtration of visible light waves 35, the first polarization axis 127 and the second polarization axis 157 may be orientated so as to be orthogonal to one another.

In some implementations, as shown in FIG. 11, the first polarizing panel 80 may be sized in relation to the retaining member 84 such that the retaining member 84 may receive the first polarizing panel 80 and/or the second polarizing panel 82 orientated in a first direction and may also receive the first polarizing panel 80 when rotated ninety degrees about a perpendicular axis (Y) to the retaining member, such that the polarization axis 127 may be positioned in any one of a plurality of predetermined orientations in relation to other ones of the first polarization panel(s) 80 and/or the second polarizing panel(s) 82. For example, the plurality of predetermined orientations may include orthogonal, parallel, and at an angle less than ninety degrees. In some implementations, similarly, the first polarizing panel 80 and/or the second polarizing panel 82 may be rotated about a longitudinal axis (Z) of the retaining member, such that the relationship between the first polarization axis 127 and the second polarization axis 157 (within the same retaining member 84 or in relationship to retaining members in other light-polarization systems 79) may be positioned in any one of the plurality of predetermined orientations in relation to other ones of the first polarization panel(s) 80 and/or the second polarizing panel(s) 82.

In some implementations, the first transparent member 88 and the second transparent member 90 may have a shape of a quadrangle with a thin, uniform thickness. However, the size and shape of the first transparent member 88 and the second transparent member 90 may vary (for example, depending upon the size and shape of the transparent sections 86 of the front wall 20a) such as to cover the transparent sections 86 with the light-polarization system 79.

Figure 9:
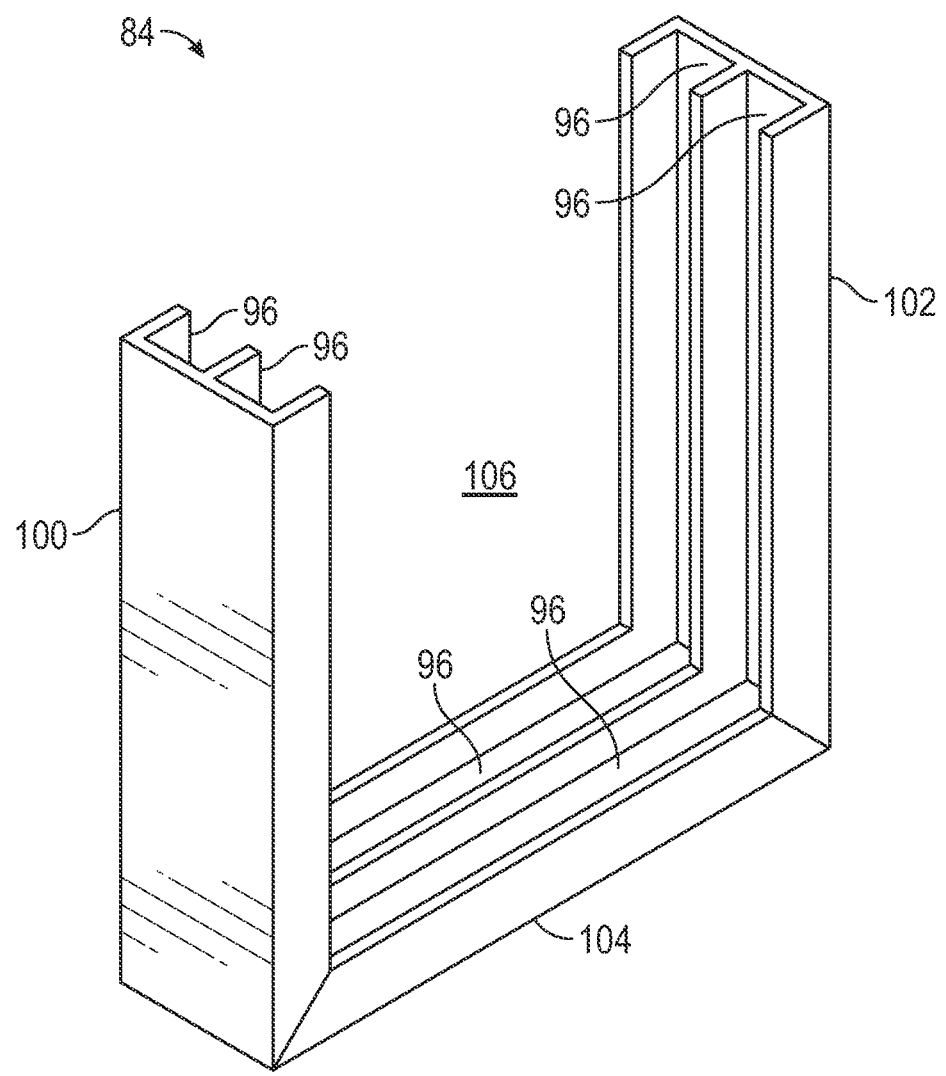
FIG. 9 is a perspective view of an exemplary component of an exemplary light-polarization system in accordance with the present disclosure.
Figure 10:
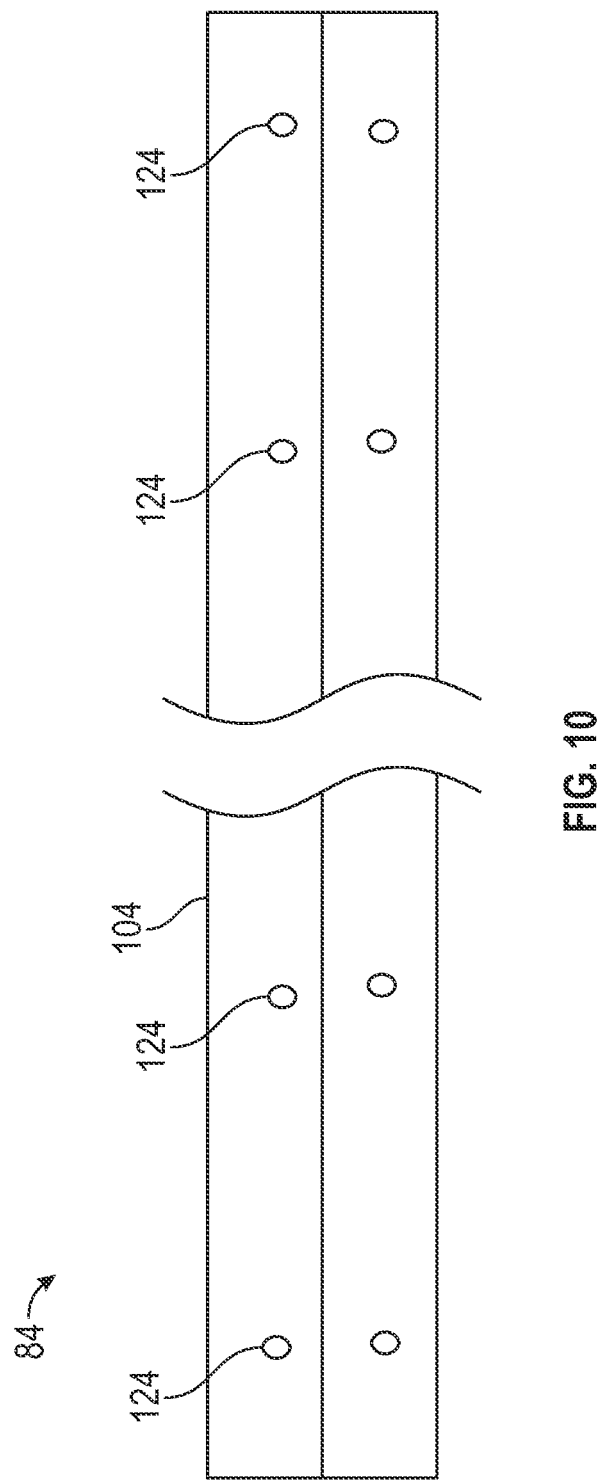
FIG. 10 is a bottom plan view of an exemplary light-polarization system in accordance with the present disclosure.

As shown in FIGS. 9-11, the retaining member 84 may comprise a sidewall 95 with a length having one or more interior channels 96 along the length, the one or more channels 96 configured to receive the first polarizing panel 80 and/or the second polarizing panel 82. The first polarizing panel 80 may be engageable with the one or more channels 96 of the retaining member 84. In some implementations, the retaining member 84 may have two, laterally adjacent, interior channels 96 along the interior length of the sidewall 95. The second polarizing panel 82 may be engageable with the one or more channels 96 of the retaining member 84.

The retaining member 84 may be shaped so as to partially or full encompass the first polarizing panel 80 and/or the second polarizing panel 82. For example, the sidewall 95 of the retaining member 84 may have a first side portion 100, a second side portion 102, and a bottom portion 104 extending between the first side portion 100 and the second side portion 102, cooperating to create a receiving space 106 for the first polarizing panel 80 and/or the second polarizing panel 82. In some implementations, the first side portion 100 is laterally opposed from the second side portion 102, leaving an opening into the receiving space 106 that is opposite the bottom portion 104 of the sidewall 95.

In some implementations, the interior channels 96 may circumscribe all or part of the receiving space 106. As shown in FIG. 9, the interior channels 96 may extend along the lengths of the interiors of the first side portion 100, the bottom portion 104, and the second side portion 102. In some implementations, the interior channel(s) 96 may extend along a portion of and/or the length of the interior of one or more of the first side portion 100, the bottom portion 104, and the second side portion 102.

As shown in FIG. 10, in some implementations the bottom portion 104 of the sidewall 95 may include one or more drain holes 124 extending from the first channel 116 and the second channel 118 through the base wall 114 of the bottom side 110. The drain holes 124 may be configured to allow fluid to drain from the retaining member 84.

As illustrated in FIG. 11, the first polarizing panel 80 may be insertable within the receiving space 106 and the interior channel 96. In implementations with two interior channels, the first polarizing panel 80 may be insertable within the receiving space 106 and a first one of the interior channels 96 and the second polarizing panel 82 may be insertable within the receiving space 106 and a second one of the interior channels 96.

In some implementations, as shown in FIG. 8, the animal containment structure 78 may further comprise a latch 140 moveable between a first position that prevents the first polarizing panel 80 and/or the second polarizing panel 82 from being removed from the retaining member 84 and a second position that allows the first polarizing panel 80 and/or the second polarizing panel 82 to be removed from the retaining member 84. In some implementations, the latch 140 may be positioned proximate to a top portion of the retaining member 84. The latch 140 may be rotatable between the first position and the second position, such as with a hinge or pin, and/or may be removably attached, and/or may including a locking mechanism. In some implementations, the latch may be connectable and/or connected to the retaining member 84 and positionable to block the removal of the first polarizing panel 80 and/or the second polarizing panel 82 from the retaining member 84.

Figure 13:
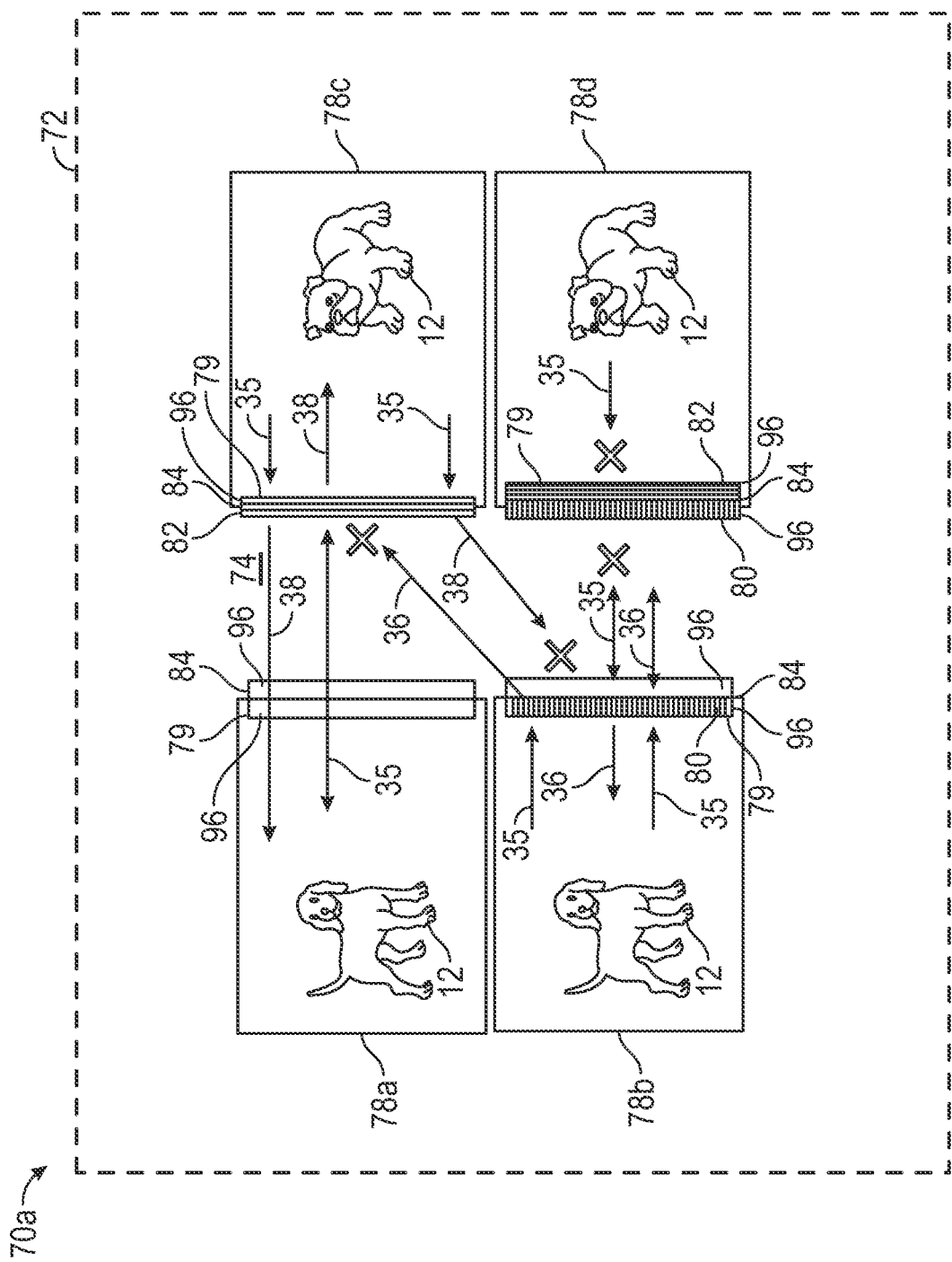
FIG. 13 is a top plan schematic view of another exemplary animal containment system in accordance with the present disclosure.

FIG. 13 illustrates another exemplary animal containment system 70a comprising two or more of the animal containment structures 78. The animal containment system 70a is similar in use and construction to the animal containment system 70 except as described below.

The animal containment system 70a may comprise two or more of the animal containment structures 78 positioned within the defined space 72 such that the viewpoint through the front wall 20a from within a first animal containment structure 78a of the animal containment structures 78 is through the front wall 20a into a second animal containment structure 78b of the animal containment structures 78. For purposes of this disclosure the term "viewpoint" is defined as a line of sight if unobscured by intervening components or structures. For exemplary purposes, the example of FIG. 13 illustrates the animal containment system 70a further comprising a third and a fourth animal containment structure 78c, 78d, positioned across the corridor 74 from the first and second containment structures 78a, 78b.

In use, a user may selectively install one or more of the first polarizing panel 80 and the second polarizing panel 82 into one or more of the retaining members 84 of the light-polarization systems 79, such as by using the receiving space 106 and the one or more channels 96, based on predetermined criteria of which viewpoints are to be blocked into/out of each of the animal containment structures 78a, 78b, 78c, 78d by use of the light-polarization systems 79.

For example, the first animal containment structure 78a may have the light-polarization system 79 configured such that neither one of the first polarizing panel 80 or the second polarizing panel 82 is engaged with the retaining member 84 initially. As such, visible light waves 35 would not be filtered through the front wall 20 of first animal containment structure 78a, and any animal 12 contained within the first animal containment structure 78a would have an unblocked viewpoint, such as into the corridor 74 and beyond (such as into the third animal containment structure 78c).

The second animal containment structure 78b may have the light-polarization system 79 configured such that the first polarizing panel 80 is engaged with the retaining member 84 via the receiving space 106 and the channel 96. In use, the first polarizing panel 80 allows first wavelength light waves 36 of visible light waves 35 that are parallel to the first polarization axis 127 to pass through the first polarizing panel 80, into and out of the second animal containment structure 78b. The first polarizing panel 80 filters (that is, blocks) second wavelength light waves 38 of visible light waves 35 that are perpendicular to the first polarization axis 127.

As such, in use, the animal 12 contained in the second animal containment structure 78b has a viewpoint out of the second animal containment structure 78b and into the corridor 74 which would, if not blocked, extend into the third animal containment structure 78c, but the animal 12 in the second animal containment structure 78b is unable to see through any light-polarization system 79 having the second polarizing panel 82 having the second polarization axis 157 orthogonal to the first polarization axis 127, as those second wavelength light waves 38 are blocked by the first polarizing panel 80.

The third animal containment structure 78c may have the light-polarization system 79 configured such that the second polarizing panel 82 is engaged with the retaining member 84 via the receiving space 106 and the channel(s) 96. The second polarizing panel 82 allows the second wavelength light waves 38 of visible light waves 35 that are parallel to the second polarization axis 157 to pass through the second polarizing panel 82 and filters (that is, blocks) the first wavelength light waves 36 of visible light waves 35 that are perpendicular to the second polarization axis 157.

As such, in use, the animal 12 contained in the third animal containment structure 78c has a viewpoint out of the third animal containment structure 78c and into the corridor 74 which would extend into the second animal containment structure 78b if not blocked, but the animal 12 is unable to see through any light-polarization system 79 having the first polarizing panel 80 having the first polarization axis 127 orthogonal to the second polarization axis 157, as the first wavelength light waves 36 are blocked by the second polarizing panel 82.

Likewise, the animal 12 contained in the second animal containment structure 78b is unable to see through the second polarizing panel 82 of the third animal containment structure 78c, as the second polarizing panel 82 in the light-polarization system 79 of the third animal containment structure 78c filters the first wavelength light waves 36 and the first polarizing panel 80 in the light-polarization system 79 of the second animal containment structure 78b filters the second wavelength light waves 38, thereby blocking all of the light waves 35 originating in the third animal containment structure 78c from reaching into the second animal containment structure 78b.

The fourth animal containment structure 78d may be positioned such that an animal 12 contained within the fourth animal containment structure 78d would have a viewpoint through the transparent portion of the front wall 20a into the first and second animal containment structures 78a, 78b. However, the fourth animal containment structure 78d may have the light-polarization system 79 configured such that the first polarizing panel 80 and the second polarizing panel 82 are both engaged with the retaining member 84 via the receiving space 106 and the channels 96. In this configuration, no visible light waves 35 are transmitted through the light-polarization system 79 of the fourth animal containment structure 78d, as the second polarizing panel 82 filters the first wavelength light waves 36 and the first polarizing panel 80 filters the second wavelength light waves 38, thereby blocking all of the light waves 35. As such, in use, the viewpoint of the animal 12 contained within the fourth animal containment structure 78d is blocked and the animal 12 cannot see outside of the fourth animal containment structure 78d, and no other animal 12 can see into the fourth animal containment structure 78d (such as from the first and second animal containment structures 78a, 78b), as the visible light waves 35 have been filtered.

It will be appreciated that the user may selectively restrict the viewpoint (visibility) through the front wall 20a of the animal containment structures 78, through the engagement and/or removal of the first polarizing panel 80 and the second polarizing panel 82 with the retaining member 84.

In some implementations, the user may secure the first polarizing panel 80 and/or the second polarizing panel 82 within the retaining member 84 of the light-polarization system 79 by engaging the latch 140, such as by moving the latch 140 from the first position to the second position.

In some implementations, the user may clean the animal containment structures 78 using water or other fluid and the water or other fluid may drain out of the light-polarization system(s) 79 via the drain holes 124.

In some implementations, an animal containment system light-polarization system kit may be provided and/or used. The kit may comprise a first one of the light-polarization system 79 for use with an animal containment structure, such as a kennel. The first removable light-polarization system 79 of the kit may comprise the first retaining member 84 having a sidewall 95 with a length and having two laterally adjacent interior channels 96 along the length, the first retaining member 84 having the first side portion 100, the second side portion 102 laterally opposed from the first side portion 100, and the bottom portion 104 extending between the first side portion 100 and the second side portion 102; wherein the first side portion 100, the second side portion 102, and the bottom portion cooperate to create the receiving space 106 having an opening opposite the bottom portion 104; the first polarizing panel 80 removably engageable with a first one of the laterally adjacent interior channels 96 through the receiving space 106 of the first retaining member 84, the first polarizing panel 80 comprising a first light filter having a first polarization axis 127 such that the first light filter blocks a first half of wavelengths of visible light waves; and the second polarizing panel 82 removably engageable with a second one of the laterally adjacent interior channels 96 through the receiving space 106 of the first retaining member 84, the second polarizing panel 82 comprising a second light filter having a second polarization axis 157 that is orthogonal to the first polarization axis 127 of the first light filter of the first polarizing panel 80, such that the second light filter blocks a second half of wavelengths of visible light waves 35.

The animal containment system light-polarization system kit may further comprise a second one of the light-polarization system 79, which may comprise a second one of the retaining member 84 having a sidewall 95 with a length and having two laterally adjacent interior channels 96 along the length, the second retaining member 84 having a first side portion 100, a second side portion 102 laterally opposed from the first side portion 100, and a bottom portion 104 extending between the first side portion 100 and the second side portion 102; wherein the first side portion 100, the second side portion 102, and the bottom portion 104 cooperate to create a receiving space 106 having an opening opposite the bottom portion 104; and a third polarizing panel (which may be the same as the first or the second polarizing panel 80, 82) removably engageable with a first one of the laterally adjacent interior channels 96 through the receiving space 106 of the second retaining member 84, the third polarizing panel 80 comprising a third light filter having a third polarization axis 127 such that the third light filter blocks a first half of wavelengths of visible light waves 35; and a fourth polarizing panel (which may be the same as the first or the second polarizing panel 80, 82) removably engageable with a second one of the laterally adjacent interior channels 96 through the receiving space 106 of the second retaining member 84, the fourth polarizing panel 82 comprising a fourth light filter having a fourth polarization axis 157 that is orthogonal to the third polarization axis 127 of the third light filter of the third polarizing panel 80, such that the fourth light filter blocks a second half of wavelengths of visible light waves 35.

In some implementations, the kit may further comprise one or more retaining member fasteners for attaching the retaining members 84 to front wall of kennels 10. The kit may further comprise one or more of the latch 140.

CONCLUSION

Conventionally, animal containment structures caused increase stress and anxiety to animals confined within them.

In accordance with the present disclosure, animal containment structures are configured to selectively allow animals visibility out the front of the structures, and can be configured to permit or block the animal inside from seeing other animals within the containment area, to reduce stress and anxiety of the confined animal. Additionally, the containment structures may be configured such that a person is able to see into the containment structure, such as to check on the well-being of the animals.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An animal containment system, comprising:
   a first animal containment structure, comprising:
      a first front wall having a transparent portion positioned such that a viewpoint through the transparent portion of the first front wall includes at least a portion of a second front wall of a second animal containment structure; and
      a first light-polarization system removably attached to the first front wall and covering the transparent portion, the first light-polarization system comprising:
         a first retaining member having a sidewall with a length and having two laterally adjacent interior channels along the length;
         a first polarizing panel removably engaged with a first one of the laterally adjacent interior channels of the first retaining member, the first polarizing panel comprising a first light filter having a first polarization axis; and
         a second polarizing panel removably engaged with a second one of the laterally adjacent interior channels of the first retaining member, the second polarizing panel comprising a second light filter having a second polarization axis that is orthogonal to the first polarization axis of the first light filter of the first polarizing panel, such that the first light-polarization system blocks visible light waves from entering and leaving the first animal containment structure.

2. The animal containment system of claim 1, further comprising:
   a second animal containment structure, comprising:
      a second front wall having a transparent portion; and
      a second light-polarization system removably attached to the second front wall and covering the transparent portion, the second light-polarization system comprising:
         a second retaining member having a sidewall with a length and having one or more interior channels along the length; and
         a third polarizing panel removably engaged with the one or more interior channels of the second retaining member, the third polarizing panel comprising a third light filter having a third polarization axis; and
   a third animal containment structure, comprising:
      a third front wall having a transparent portion positioned such that a viewpoint through the transparent portion of the third front wall includes at least a portion of the second front wall of the second animal containment structure; and
      a third light-polarization system removably attached to the third front wall and covering the transparent portion, the third light-polarization system comprising:
         a third retaining member having a sidewall with a length and having one or more interior channels along the length; and
         a fourth polarizing panel engaged with the one or more interior channels of the third retaining member, the fourth polarizing panel comprising a fourth light filter having a fourth polarization axis that is orthogonal to the third polarization axis of the second light filter of the second light-polarization system of the second animal containment structure.

3. The animal containment system of claim 2, wherein the first animal containment structure further comprises one or more first surrounding wall constructed of an opaque material connected to, and cooperating with, the first front wall to form a first animal containment space; the second animal containment structure further comprises one or more second surrounding wall constructed of an opaque material connected to, and cooperating with, the second front wall to form a second animal containment space; and the third animal containment structure further comprises one or more third surrounding wall constructed of an opaque material connected to, and cooperating with, the third front wall to form a third animal containment space.

4. The animal containment system of claim 2, wherein the second retaining member has a first side portion, a second side portion laterally opposed from the first side portion, and a bottom portion extending between the first side portion and the second side portion, the first side portion, the second side portion, and the bottom portion cooperating to create a receiving space having an opening opposite the bottom portion for receiving the third polarizing panel; and wherein the third retaining member has a first side portion, a second side portion laterally opposed from the first side portion, and a bottom portion extending between the first side portion and the second side portion, the first side portion, the second side portion, and the bottom portion cooperating to create a receiving space having an opening opposite the bottom portion for receiving the fourth polarizing panel.

5. The animal containment system of claim 1, wherein the first polarizing panel further comprises a first transparent member having a planar surface, and wherein the first light filter is a light-polarizing film adhered to the planar surface of the first transparent member.

6. The animal containment system of claim 1, wherein the first polarizing panel further comprises:
- a first transparent member having a first planar surface; and
- a second transparent member having a second planar surface; and
- wherein the first light filter is a light-polarizing film interposed between the first planar surface of the first transparent member and the second planar surface of the second transparent member.

7. The animal containment system of claim 1, wherein the first retaining member has a first side portion, a second side portion laterally opposed from the first side portion, and a bottom portion extending between the first side portion and the second side portion, the first side portion, the second side portion, and the bottom portion cooperating to create a receiving space having an opening opposite the bottom portion for receiving the first polarizing panel and the second polarizing panel.

8. The animal containment system of claim 7, wherein the bottom portion of the first retaining member has one or more drain holes.

9. The animal containment system of claim 1, wherein the first light-polarization system further comprises a latch connected to the first retaining member and positioned to block removal of the first polarizing panel and the second polarizing panel from the first retaining member.

10. A method for implementing a kennel system, comprising:
- inserting a first light-polarizing panel within a first one of two laterally adjacent interior channels along a length of a sidewall of a first retaining member of a first light-polarization system attached to a first front wall of a first kennel, thereby covering a transparent portion of the first front wall, the transparent portion positioned such that a viewpoint from within the first kennel through the transparent portion of the first front wall includes at least a portion of a second front wall of a second kennel and such that a viewpoint from within the second kennel includes at least a portion of the first front wall of the first kennel, the first light-polarizing panel comprising a first light filter having a first polarization axis such that wavelength light waves parallel to the first polarization axis pass through the first light filter and such that wavelength light waves perpendicular to the first polarization axis are blocked from passing through the first light filter; and
- inserting a second light-polarizing panel within a second one of the two laterally adjacent interior channels along the length of the sidewall of the first retaining member, the second polarizing panel comprising a second light filter having a second polarization axis such that wavelength light waves parallel to the second polarization axis pass through the second light filter and such that wavelength light waves perpendicular to the second polarization axis are blocked from passing through the second light filter,
- wherein the second polarization axis is orthogonal to the first polarization axis of the first light filter, such that wavelength light waves that have passed through the first light filter are blocked from passing through the second light filter, and such that wavelength light waves that have passed through the second light filter are blocked from passing through the first light filter, thereby blocking the viewpoint out of and into the first kennel.

11. The method for implementing a kennel system of claim 10, further comprising:
- inserting a third light-polarizing panel within an interior channel of a sidewall of a second retaining member of a second light-polarization system attached to a second front wall of the second kennel, thereby covering a transparent portion of the second front wall, the third light-polarizing panel comprising a third light filter having a third polarization axis such that wavelength light waves parallel to the third polarization axis pass through the third light filter and such that wavelength light waves perpendicular to the third polarization axis are blocked from passing through the third light filter; and
- inserting a fourth light-polarizing panel within an interior channel of a sidewall of a third retaining member of a third light-polarization system attached to a third front wall of a third kennel, thereby covering a transparent portion of the third front wall, the transparent portion positioned such that a viewpoint from within the third kennel through the transparent portion of the third front wall includes at least a portion of the second front wall of the second kennel and such that a viewpoint from within the second kennel includes at least a portion of the third front wall of the third kennel, the fourth polarizing panel comprising a fourth light filter having a fourth polarization axis such that wavelength light waves parallel to the fourth polarization axis pass through the fourth light filter and such that wavelength light waves perpendicular to the fourth polarization axis are blocked from passing through the fourth light filter,
- wherein the fourth polarization axis is orthogonal to the third polarization axis of the third light filter of the third light-polarization system, such that wavelength light waves that have passed through the third light filter are blocked from passing through the fourth light filter, and such that wavelength light waves that have passed through the fourth light filter are blocked from passing through the third light filter, thereby blocking the viewpoint from within the second kennel into the third kennel and blocking the viewpoint from within the third kennel into the second kennel, while maintaining a first view from within the second kennel to outside of the second kennel and maintaining a second view from within the third kennel to outside of the third kennel.

12. The method for implementing a kennel system of claim 11, wherein the first kennel further comprises one or more first surrounding wall constructed of an opaque material connected to, and cooperating with, the first front wall to form a first animal containment space; the second kennel further comprises one or more second surrounding wall constructed of an opaque material connected to, and cooperating with, the second front wall to form a second animal containment space; and the third kennel further comprises one or more third surrounding wall constructed of an opaque material connected to, and cooperating with, the third front wall to form a third animal containment space.

13. The method for implementing a kennel system of claim 11, wherein the second retaining member has a first side portion, a second side portion laterally opposed from the first side portion, and a bottom portion extending between the first side portion and the second side portion, the first side portion, the second side portion, and the bottom portion cooperating to create a receiving space having an opening opposite the bottom portion for receiving the third polarizing panel; and wherein the third retaining member has a first side portion, a second side portion laterally opposed from the first side portion, and a bottom portion extending between the first side portion and the second side portion, the first side portion, the second side portion, and the bottom portion cooperating to create a receiving space having an opening opposite the bottom portion for receiving the fourth polarizing panel.

14. The method for implementing a kennel system of claim 13, wherein the bottom portion of the second retaining member has one or more drain holes, and wherein the bottom portion of the third retaining member has one or more drain holes.

15. The method for implementing a kennel system of claim 10, wherein the first polarizing panel further comprises a first transparent member having a planar surface, and wherein the first light filter is a light-polarizing film adhered to the planar surface of the first transparent member.

16. The method for implementing a kennel system of claim 10, wherein the first polarizing panel further comprises:
   a first transparent member having a first planar surface; and
   a second transparent member having a second planar surface; and
   wherein the first light filter is a light-polarizing film interposed between the first planar surface of the first transparent member and the second planar surface of the second transparent member.

17. The method for implementing a kennel system of claim 10, wherein the first retaining member has a first side portion, a second side portion laterally opposed from the first side portion, and a bottom portion extending between the first side portion and the second side portion, the first side portion, the second side portion, and the bottom portion cooperating to create a receiving space having an opening opposite the bottom portion for receiving the first polarizing panel.

18. The method for implementing a kennel system of claim 17, wherein the bottom portion of the first retaining member has one or more drain holes.

19. The method for implementing a kennel system of claim 10, wherein the first light-polarization system further comprises a latch connected to the first retaining member and positioned to block removal of the first polarizing panel from the first retaining member.

20. An animal containment system light-polarization system kit, comprising:
   a first light-polarization system, comprising:
      a first retaining member having a sidewall with a length and having two laterally adjacent interior channels along the length, the first retaining member having a first side portion, a second side portion laterally opposed from the first side portion, and a bottom portion extending between the first side portion and the second side portion; the first side portion, the second side portion, and the bottom portion cooperating to create a receiving space having an opening opposite the bottom portion;
      a first polarizing panel removably engageable with a first one of the laterally adjacent interior channels through the receiving space of the first retaining member, the first polarizing panel comprising a first light filter having a first polarization axis such that the first light filter blocks a first half of wavelengths of visible light waves; and
      a second polarizing panel removably engageable with a second one of the laterally adjacent interior channels through the receiving space of the first retaining member, the second polarizing panel comprising a second light filter having a second polarization axis that is orthogonal to the first polarization axis of the first light filter of the first polarizing panel, such that the second light filter blocks a second half of wavelengths of visible light waves; and
   a second light-polarization system, comprising:
      a second retaining member having a sidewall with a length and having two laterally adjacent interior channels along the length, the second retaining member having a first side portion, a second side portion laterally opposed from the first side portion, and a bottom portion extending between the first side portion and the second side portion; the first side portion, the second side portion, and the bottom portion cooperating to create a receiving space having an opening opposite the bottom portion;
      a third polarizing panel removably engageable with a first one of the laterally adjacent interior channels through the receiving space of the second retaining member, the third polarizing panel comprising a third light filter having a third polarization axis such that the third light filter blocks a first half of wavelengths of visible light waves; and
      a fourth polarizing panel removably engageable with a second one of the laterally adjacent interior channels through the receiving space of the second retaining member, the fourth polarizing panel comprising a fourth light filter having a fourth polarization axis that is orthogonal to the third polarization axis of the third light filter of the third polarizing panel, such that the fourth light filter blocks a second half of wavelengths of visible light waves.

* * * * *